United States Patent
Nakano

(10) Patent No.: US 10,007,973 B2
(45) Date of Patent: Jun. 26, 2018

(54) IMAGE PROCESSING APPARATUS, METHOD OF CONTROLLING IMAGE PROCESSING APPARATUS, AND STORAGE MEDIUM

(71) Applicant: CANON KABUSHIKI KAISHA, Tokyo (JP)

(72) Inventor: Yuta Nakano, Maebashi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days. days.

(21) Appl. No.: 15/273,793

(22) Filed: Sep. 23, 2016

(65) Prior Publication Data

US 2017/0109871 A1    Apr. 20, 2017

(30) Foreign Application Priority Data

Sep. 29, 2015 (JP) .................... 2015-192223
Dec. 28, 2015 (JP) .................... 2015-257328

(51) Int. Cl.
*G06T 5/00* (2006.01)
*G06T 11/00* (2006.01)
(Continued)

(52) U.S. Cl.
CPC ............ *G06T 5/008* (2013.01); *G06T 5/50* (2013.01); *G06T 7/0016* (2013.01); *G06T 7/11* (2017.01);
(Continued)

(58) Field of Classification Search
CPC ..... G06T 5/008; G06T 7/0016; G06T 11/003; G06T 5/50; G06T 2207/10081;
(Continued)

(56) References Cited

U.S. PATENT DOCUMENTS 6,771,842 B1 *  8/2004  Sakai ................. G06T 3/608
                                                     358/488
6,937,212 B2    8/2005  Brewer et al.
(Continued)

FOREIGN PATENT DOCUMENTS

WO    2011/125369 A1    10/2011

OTHER PUBLICATIONS

Hyunjin Park, et al., "Construction of an Abdominal Probabilistic Atlas and its Application in Segmentation," IEEE Transactions on Medical Imaging, vol. 22, No. 4, Apr. 2003, pp. 483-492.
(Continued)

*Primary Examiner* — Brenda C Bernardi
(74) *Attorney, Agent, or Firm* — Fitzpatrick, Cella, Harper & Scinto

(57) ABSTRACT

An image processing apparatus includes at least one processor operatively coupled to a memory, serving as an obtaining unit configured to obtain a contrast material-enhanced image of an object, a first region extraction unit configured to extract a first region representing a first anatomical portion of the object from the image, an estimation unit configured to estimate a state of the image concerning a temporal change in gray level from the first region, and a second region extraction unit configured to extract a second region representing a second anatomical portion of the object from the image based on an estimation result obtained by the estimation unit.

23 Claims, 13 Drawing Sheets

(51) Int. Cl.
*G06T 5/50* (2006.01)
*G06T 7/00* (2017.01)
*G06T 7/11* (2017.01)
*G06T 7/162* (2017.01)

(52) U.S. Cl.
CPC ............ *G06T 7/162* (2017.01); *G06T 11/003* (2013.01); *G06T 2207/10081* (2013.01); *G06T 2207/10088* (2013.01); *G06T 2207/20116* (2013.01); *G06T 2207/20128* (2013.01); *G06T 2207/20182* (2013.01); *G06T 2207/30004* (2013.01); *G06T 2207/30061* (2013.01); *G06T 2211/40* (2013.01)

(58) Field of Classification Search
CPC . G06T 2207/10088; G06T 2207/20141; G06T 2207/20116; G06T 2207/20182; G06T 2207/30004; G06T 2211/40
See application file for complete search history.

(56) References Cited

U.S. PATENT DOCUMENTS

| | | |
|---|---|---|
| 8,116,844 B2 | 2/2012 | Schmidt |
| 2008/0298682 A1* | 12/2008 | Cocosco ................... G06T 7/11 |
| | | 382/173 |
| 2009/0156927 A1 | 6/2009 | Schmidt |
| 2010/0080434 A1* | 4/2010 | Seifert ................ G06K 9/4638 |
| | | 382/131 |
| 2011/0002520 A1 | 1/2011 | Suehling et al. |

OTHER PUBLICATIONS

Communication including extended European Search Report dated Feb. 22, 2017, issued in corresponding European Patent Application No. 16190989.0-1666.

* cited by examiner

FIG. 10
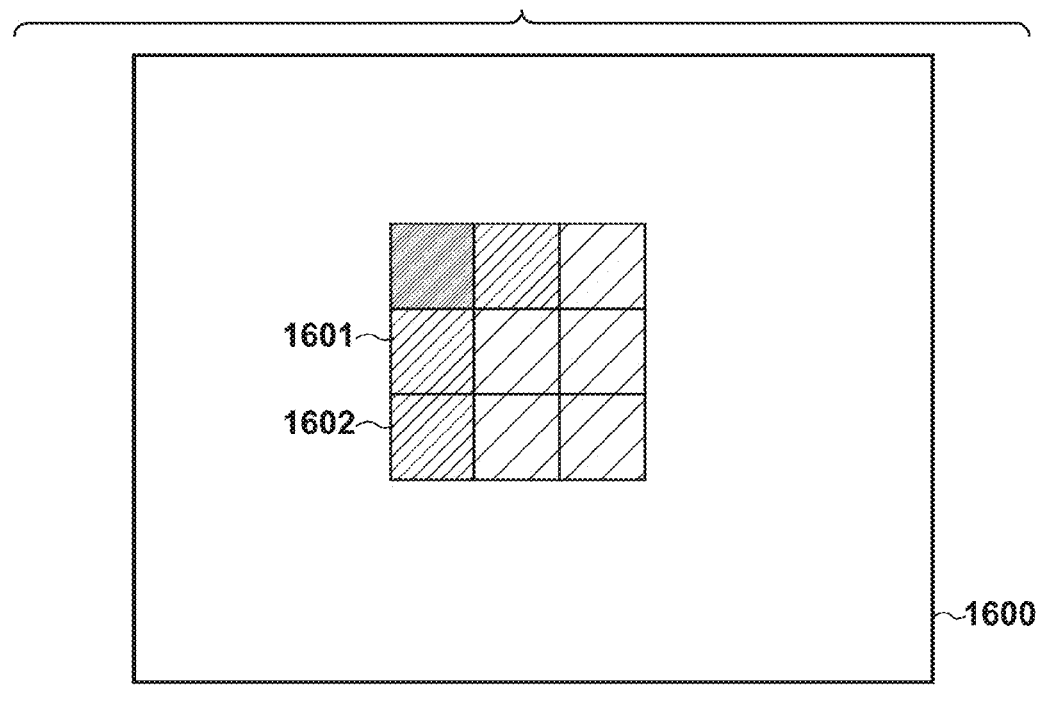
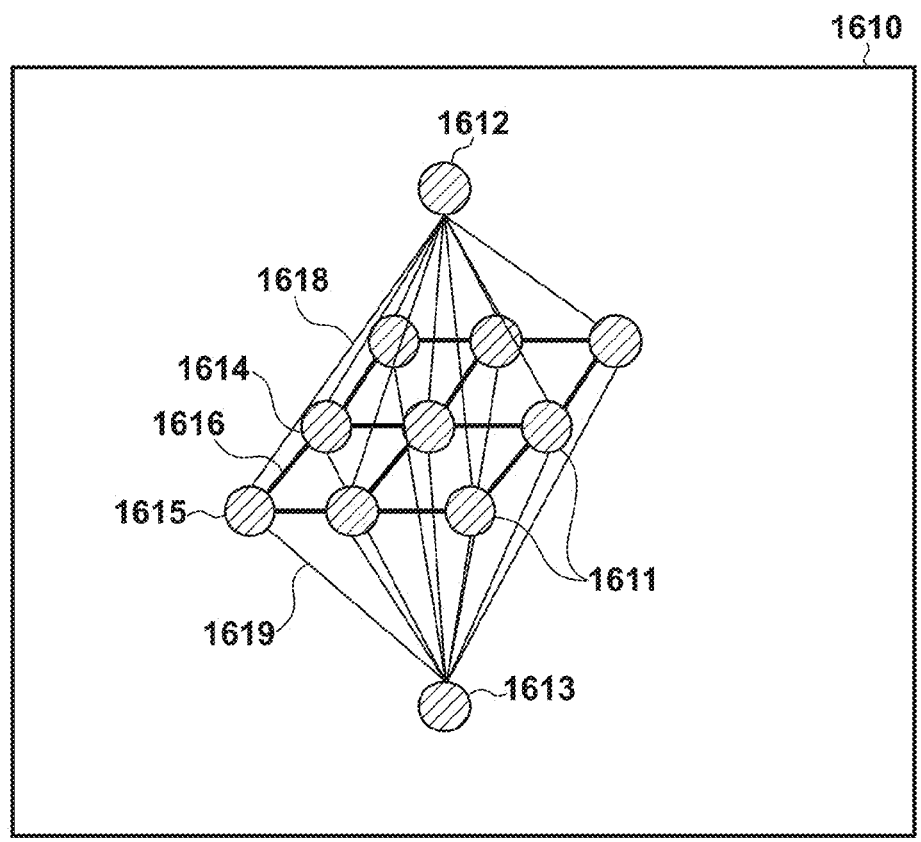

IMAGE PROCESSING APPARATUS, METHOD OF CONTROLLING IMAGE PROCESSING APPARATUS, AND STORAGE MEDIUM

BACKGROUND OF THE INVENTION

Field of the Invention

The present invention relates to an image processing apparatus, a method of controlling the image processing apparatus, and a storage medium and, more particularly, to a technique of processing a medical image captured by a medical image acquisition apparatus (modality) such as an X-ray computed tomography apparatus (X-ray CT).

Description of the Related Art

In image diagnosis using a medical image (for example, a three-dimensional tomographic image representing information inside an object), image capturing is sometimes performed by using a contrast material to emphasize an anatomical portion such as a lesion portion, blood vessel, or specific organ. Administering a contrast material will increase the contrast between adjacent organs or of a lesion portion, blood vessel, or the like existing in an organ, thereby facilitating the grasping its shape. However, at different elapsed times since the administration of a contrast material, even the same anatomical portion exhibits different degrees of contrast enhancement. For this reason, information identifying the elapsed time since administration is recorded on an image, medical record, or the like.

For example, in contrast material-enhancement CT, a parameter called a phase is defined, which represents that image capturing has been performed after a specific time elapsed since the administration of a contrast material. This parameter is included in the header portion of an image. Phases are often classified into four categories when they are recorded. The first category is "non-contrast enhancement" indicating that image capturing has been performed without administering any contrast material. With regards to images captured by administering a contrast material, phases are classified into the following three categories: "early phase", "portal phase", and "late phase" in ascending order of elapsed time since contrast material administration.

The gray level distribution of an anatomical portion such as an organ greatly changes with phase even within the same portion. In the image processing of extracting, for example, the region of each portion, when processing images in various phases, it is sometimes impossible to perform accurate extraction with one image processing parameter. There is available the MPA (Maximum a Posteriori) method as one of typical region extraction methods for medical image processing. This method calculates a likelihood indicating that each voxel in an image belongs to a specific portion by using a probabilistic atlas prepared in advance, which represents the existence probability of each portion, and the prior distribution of the gray levels in the respective portions. The region of each portion is then extracted from an image based on the likelihood.

According to Hyunjin Park, Peyton H. Bland, Charles R. Meyer "Construction of an Abdominal Probabilistic Atlas and its Application in Segmentation", IEEE Transactions on Medical Imaging, Vol. 22, No. 4, April 2003, liver and kidney regions are extracted by using the MAP method. It is important for the MPA method to provide the prior distribution of the gray levels in each portion with as high accuracy as possible.

However, according to the technique disclosed in Hyunjin Park, Peyton H. Bland, Charles R. Meyer "Construction of an Abdominal Probabilistic Atlas and its Application in Segmentation", IEEE Transactions on Medical Imaging, Vol. 22, No. 4, April 2003, since the gray level distribution of each portion greatly changes with phase, when the phase information of image data is unknown, it is impossible to accurately provide a prior distribution of gray levels and hence to stably perform region extraction. In addition, any deficit or error in phase information in image data will disable the selection of a proper image processing parameter using phase information (for example, the selection of the prior distribution of the gray levels in each portion in the MAP method). That is, the problem is that any deficit or error in phase information in image data will decrease the accuracy of subsequent image processing.

The present invention has been made in consideration of the above problem and provides a technique of improving the accuracy of subsequent image processing even with a deficit or error in phase information in image data.

SUMMARY OF THE INVENTION

According to one aspect, the present invention provides an image processing apparatus comprising an obtaining unit configured to obtain a contrast material-enhanced image of an object, a first region extraction unit configured to extract a first region representing a first anatomical portion of the object from the image, an estimation unit configured to estimate a state of the image concerning a temporal change in gray level from the first region, and a second region extraction unit configured to extract a second region representing a second anatomical portion of the object from the image based on an estimation result obtained by the estimation unit.

Further features of the present invention will become apparent from the following description of exemplary embodiments with reference to the attached drawings.

BRIEF DESCRIPTION OF THE DRAWINGS

FIG. 10 is a schematic view for explaining a graph in a graph cut method;

DESCRIPTION OF THE EMBODIMENTS

Figure 1:
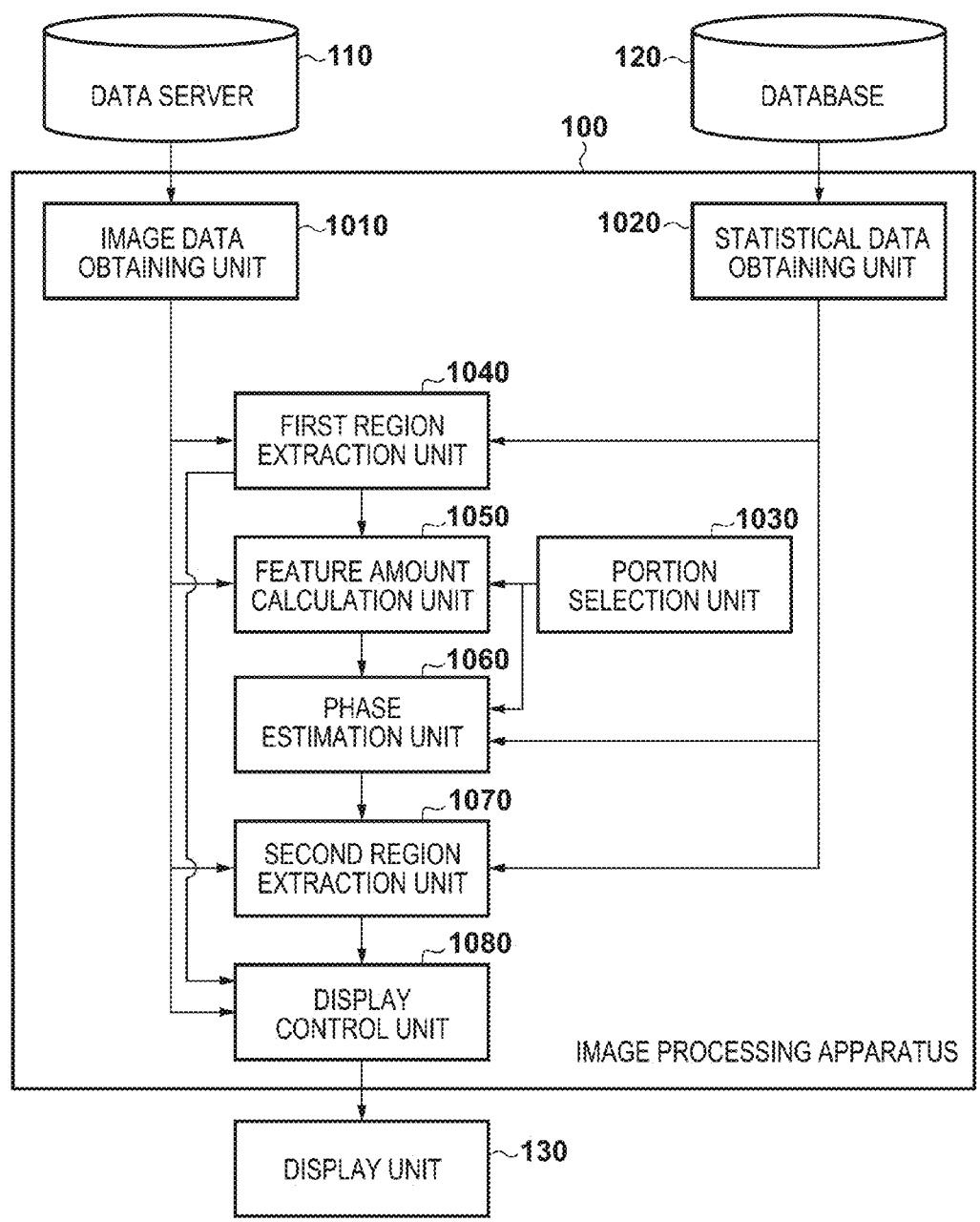
FIG. 1 is a block diagram showing an example of the arrangement of an image processing apparatus according to the first embodiment.

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

<Overview>

An image processing apparatus according to this embodiment extracts the region of a predetermined anatomical portion of an object, such as an organ or lesion portion, from a three-dimensional medical image. In this case, the apparatus estimates a phase (for example, "non-contrast enhancement", "early phase", "portal phase", or "late phase") from an input image, and sets a parameter for subsequent processing based on the estimation result. This makes it possible to select a proper parameter and obtain a favorable region extraction result even if the header portion of the input image includes no phase information or phase information is wrong.

More specifically, the image processing apparatus according to this embodiment performs region extraction (first region extraction) of a first anatomical portion without using any phase information and region extraction (second region extraction) of a second anatomical portion by using estimated phase information. At the time of the first region extraction, since no phase information can be used, it is not possible to obtain the prior distribution of gray levels concerning a portion as an extraction target with high accuracy. The image processing apparatus according to the embodiment therefore selects only an anatomical portion statistically exhibiting few positional variations among patients as the first anatomical portion. The apparatus executes region extraction with importance being placed on positional information (which can be executed even if the prior distribution of gray levels is ambiguous). The apparatus further calculates gray level distribution information in the first region as an image feature amount used for the estimation of a phase by using the first region extraction result. The apparatus then estimates the phase of the image based on this gray level distribution information.

On the other hand, the second region extraction is performed by using estimated phase information. That is, the image processing apparatus according to this embodiment selects a parameter for image processing used for the second region extraction based on the estimated phase. More specifically, the apparatus estimates the prior distribution of the gray levels in the second anatomical portion with high accuracy based on the phase information, and executes region extraction using the prior distribution. This can obtain a better result than when performing region extraction without using any phase information.

Assume that in the following description, the image processing apparatus according to this embodiment processes a three-dimensional image of the thoracoabdominal portion of an object as a processing target. In addition, the following description will exemplify a case in which each of the regions of the liver, heart, left kidney, right kidney, and spleen is extracted as an anatomical portion from an image. In this case, the liver and the heart are portions each having the property of exhibiting small positional variations among patients. That is, these portions can be easily extracted even if the phase is unknown. In addition, the portions exhibit different temporal enhancement patterns (the contrast peak of the heart is earlier than that of the liver). That is, it is possible to stably estimate a phase by combining the pieces of distribution information of the gray levels in the two regions. In consideration of the above properties, this embodiment is configured to select the liver and heart as first anatomical portions, and regards the remaining organs as second anatomical portions. The arrangement of the image processing system and its processing will be described below with reference to FIGS. 1 to 3.

<Arrangement of Image Processing System>

FIG. 1 shows an example of the arrangement of the image processing system according to this embodiment. As shown in FIG. 1, an image processing apparatus 100 according to the embodiment is connected to a data server 110, a database 120, and a display unit 130.

The data server 110 holds, as image data, three-dimensional tomographic images (volume data) obtained in advance by capturing images of objects under certain conditions (modalities, image capturing modes, dates and times, body postures, and the like). Modalities for capturing three-dimensional tomographic images may include an MRI (Magnetic Resonance Imaging) apparatus, X-ray CT (Computed Tomography) apparatus, three-dimensional ultrasonic imaging apparatus, photoacoustic tomography apparatus, and PET/SPECT apparatus. In this case, PET is an abbreviation for positron emission tomography, and SPECT is an abbreviation for single photon emission computed tomography. Image data is input to the image processing apparatus 100 via an image data obtaining unit 1010.

The database 120 holds statistical data used for extraction processing. In this case, statistical data includes the probabilistic atlas of each portion and the prior distribution (the average value and variance value) of the gray levels in each portion. Statistical data is input to the image processing apparatus 100 via a statistical data obtaining unit 1020.

The display unit 130 is a liquid crystal monitor or the like, and displays various types of information such as a display image generated by the image processing apparatus 100. The display unit 130 is also provided with a GUI (Graphical User Interface) for obtaining instructions from the user.

<Arrangement of Image Processing Apparatus>

The image processing apparatus 100 is constituted by constituent elements described below. The image data obtaining unit 1010 obtains, from the data server 110, image data (input image) to be input to the image processing apparatus 100. The image data obtaining unit 1010 then outputs the obtained input image to a first region extraction unit 1040, a feature amount calculation unit 1050, a second region extraction unit 1070, and a display control unit 1080.

The statistical data obtaining unit 1020 obtains, from the database 120, statistical data to be input to the image processing apparatus 100. The statistical data obtaining unit 1020 outputs the obtained statistical data to the first region extraction unit 1040, a phase estimation unit 1060, and the second region extraction unit 1070. A portion selection unit 1030 selects a first anatomical portion. The portion selection unit 1030 outputs the information of the selected portion to the feature amount calculation unit 1050 and the phase estimation unit 1060. The first region extraction unit 1040 extracts a region (first region) of the first anatomical portion from the input image. The first region extraction unit 1040 uses statistical data obtained by the statistical data obtaining unit 1020 for this processing. The first region extraction unit 1040 outputs the information of the extracted first region to the feature amount calculation unit 1050 and the display control unit 1080.

The feature amount calculation unit 1050 calculates a feature amount concerning the gray levels in the first anatomical portion from the input image by using the information of the first region extracted by the first region extraction unit 1040. The feature amount calculation unit 1050 then outputs the calculated feature amount to the phase estimation unit 1060. The phase estimation unit 1060 estimates a state concerning a temporal change in gray level, for example, a phase (for example, "non-contrast enhancement", "early phase", "portal phase", or "late phase") at the time of contrast material-enhancement for the input image, by using the feature amount concerning the gray level calculated by the feature amount calculation unit 1050. The phase estimation unit 1060 uses the statistical data obtained by the statistical data obtaining unit 1020 for this processing. The phase estimation unit 1060 then outputs the information of the estimated phase to the second region extraction unit 1070.

The second region extraction unit 1070 extracts a region (second region) of a second anatomical portion from the input image by using the information of the phase estimated by the phase estimation unit 1060. The second region extraction unit 1070 performs this processing by using the statistical data obtained by the statistical data obtaining unit 1020. The second region extraction unit 1070 then outputs the information of the extracted second region to the display control unit 1080. The display control unit 1080 controls the display unit 130 to display the input image and the region extraction results in accordance with an input from an operation unit (not shown) operated by the user.

The probabilistic atlas held by the database 120 will be described below. A probabilistic atlas indicates the probability at which the position of each pixel belongs to a specific portion in a standardized image of an object. A probabilistic atlas is generated by the following procedure. First of all, label images representing anatomical portions are manually generated with respect to the image data of many cases captured in advance. This embodiment uses five labels of the heart, liver, right kidney, left kidney, and spleen as the labels of anatomical portions. Image spaces between the respective cases are standardized, and the label images are superimposed on each other. With this processing, at each pixel, the existence probability of each portion can be calculated from the number of labels superimposed. An image made to have the calculated existence probabilities as pixel values is a probabilistic atlas. Note that space standardization can be performed by processing similar to that in steps S2010 and S2020 described later. This makes it possible to perform both space standardization at the time of generating an atlas and space standardization for an input image and a probabilistic atlas by using the same algorithm.

In addition, the database 120 stores the prior distribution of the gray levels in each portion for each phase. The database 120 also stores, for each portion, the prior distribution of gray levels to be used when a phase is unknown. This embodiment will exemplify a case in which average values and variance values are held, assuming that each prior distribution of gray levels is a Gaussian distribution. In the following description, the prior distribution of the gray levels in an anatomical portion l in a phase t is represented by an average value $I_{l\_t\_DB}$ and a variance value $\sigma_{l\_t\_DB}^2$. In addition, the prior distribution of the gray levels in the anatomical portion l to be used when a phase is unknown is represented by an average value $I_{l\_DB}$ and a variance value $\sigma_{l\_DB}^2$. In this case, the prior distribution of gray levels is calculated from label images of a plurality of cases used for the generation of a probabilistic atlas. That is, the average value and variance value of the gray levels in the region of each portion in all the cases in the same phase are obtained as the prior distribution of the gray levels in the portion in the phase. In addition, the average of prior distributions in each phase (the average of average values and the average of variance values) is obtained as the prior distribution of the gray levels in the portion when a phase is unknown. Note that a prior distribution in one of phases may be used as a substitute for a prior distribution when a phase is unknown. In this case, the prior distribution in any specific phase to be used can be determined by a preliminary experiment using the image data of a plurality of cases included in the database 120. In this embodiment, when a phase is unknown, a prior distribution in a portal phase is used.

Note that a prior distribution to be used when a phase is unknown may be obtained by other methods. For example, the average value and variance value of the gray levels in the region of each portion in all the cases without any limitation in terms of phase are obtained. The obtained values may be defined as the prior distribution of the gray levels in the portion when a phase is unknown. In this case, since the statistics of the gray levels in all the phases are obtained, the variance becomes larger than that when statistics are obtained for each phase. As a consequence, when a phase is unknown, it is possible to execute estimation with higher importance being placed on positional information based on a probabilistic atlas than the prior distribution of gray levels.

<Processing by Image Processing Apparatus>

Figure 2:
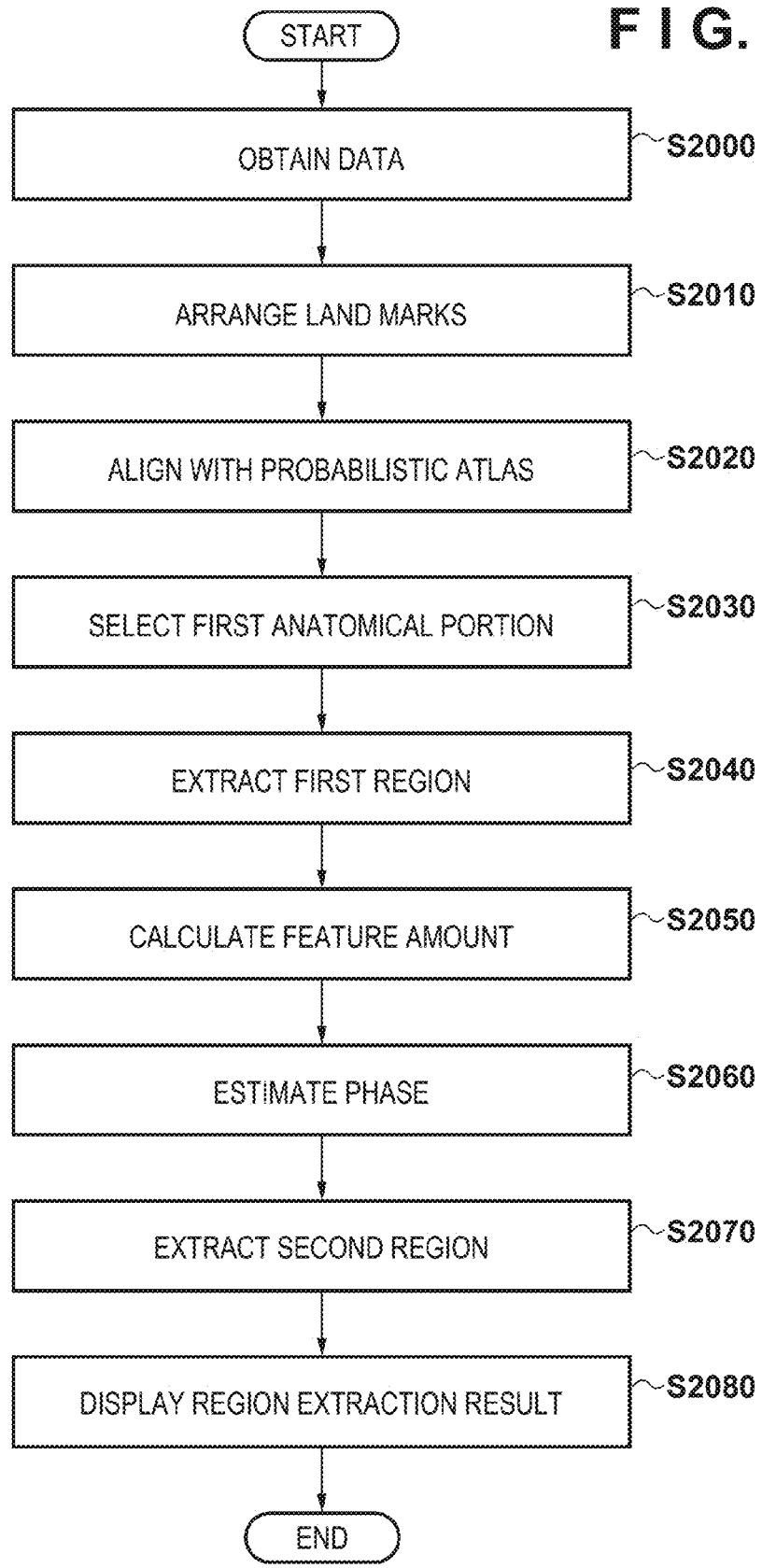
FIG. 2 is a flowchart showing an overall processing procedure executed by the image processing apparatus according to the first embodiment.

FIG. 2 is a flowchart showing an overall processing procedure executed by the image processing apparatus 100 according to this embodiment.

(Step S2000: Obtaining of Data)

In step S2000, the image data obtaining unit 1010 obtains, from the data server 110, an input image as a processing target. In addition, the statistical data obtaining unit 1020 obtains statistical data from the database 120.

(Step S2010: Arranging of Land Marks)

In step S2010, the first region extraction unit 1040 arranges land marks on the input image obtained in step S2000. These land marks are used to align a probabilistic atlas with the input image in a subsequent process. In this embodiment, the first region extraction unit 1040 extracts a lung region and a pelvis region from the input image by threshold processing, and arranges land marks based on the barycentric position of each region.

More specifically, first of all, the first region extraction unit 1040 finds an axial slice including the barycenter of the extracted lung region and an axial slice including the barycenter of the extracted pelvis region. This unit then extracts body surfaces from the axial slices by threshold processing. Finally, the unit moves a search point vertically and horizontally on each axial slice, and arranges land marks at positions where the search point comes into contact with the body surface.

Figure 3:
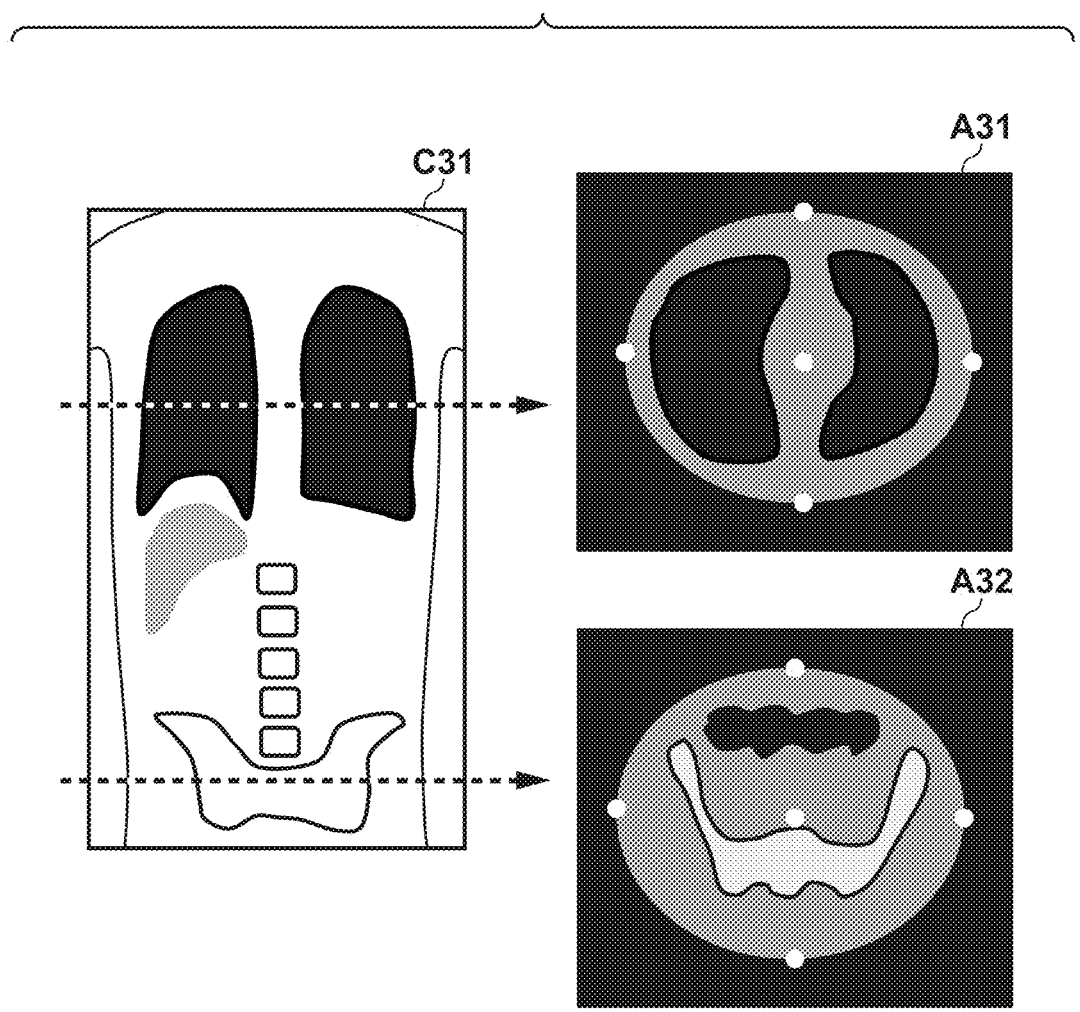
FIG. 3 is a view showing, on images, land marks used for alignment processing according to the first embodiment.

FIG. 3 is a schematic view showing an input image on which land marks are arranged. This view includes a coronal slice C31, an axial slice A31 passing through the barycenter of the lung region, and an axial slice A32 passing through the barycenter of the pelvis region. The broken line arrows on the coronal slice C31 represent the positions of the slices A31 and A32. The white points arranged on the slices A31 and A32 correspond to land marks according to this embodiment. Note that it is not always necessary to automatically arrange land marks, and the user may input land marks by using a user interface.

(Step S2020: Alignment with Probabilistic Atlas)

In step S2020, the first region extraction unit 1040 aligns the probabilistic atlas stored in the database 120 with the input image by using the land marks arranged in step S2010. In this embodiment, the land marks arranged in step S2010 are made to correspond to the land marks on the probabilistic atlas. A deformation field is generated by using RBF (Radial Basis Function) as one of typical deformation models to deform the probabilistic atlas in accordance with the input image. This can remove the bias caused by the patient from the position of each anatomical portion. Note that a technique used for image deformation need not always be RBF. For example, it is possible to use FFD (Free Form Deformation) as one of typical deformation models.

(Step S2030: Selection of First Anatomical Portions)

In step S2030, the portion selection unit 1030 selects first anatomical portions from anatomical portions as extraction targets of the image processing apparatus 100. In this embodiment, for the above reason, the heart and the liver are selected as first anatomical portions. Note that first anatomical portions may be adaptively selected in accordance with an input image. For example, the portion selection unit 1030 may determine, based on the result of alignment with the probabilistic atlas obtained in step S2020, whether the heart and the liver as candidate portions are included in the input image, and select only the portion included in the input image as a first anatomical portion.

(Step S2040: Extraction of First Regions)

In step S2040, the first region extraction unit 1040 extracts the regions of the first anatomical portions selected in step S2030 from the input image. This embodiment uses, as a region extraction method, the MAP method disclosed in Hyunjin Park, Peyton H. Bland, Charles R. Meyer "Construction of an Abdominal Probabilistic Atlas and its Application in Segmentation", IEEE Transactions on Medical Imaging, Vol. 22, No. 4, April 2003. The MAP method is a method of assigning a portion label exhibiting the maximum posterior probability to each pixel based on a feature amount (a gray level in this case) observed in each pixel. Each portion label is expressed as follows:

$$\hat{l}_p = \text{argmax}_{l \in L} p_p(l|v) \quad (1)$$

where L is a set of labels assigned to anatomical portions as extraction targets, l is one of the labels, v is a gray level, and $p_p(l|v)$ is the posterior probability of the label 1 at a position p. The first region extraction unit 1040 obtains the posterior probability $p_p(l|v)$ of each label l with respect to each pixel, and decides the label of each pixel according to equation (1). Although the purpose of processing performed by the first region extraction unit 1040 in this step is to extract the regions of first anatomical portions, actual processing is performed so as to execute region extraction of all portions including second anatomical portions.

Derivation processing of the posterior probability $p_p(l|v)$ of each label l, which is necessary for the calculation of equation (1) described above, will be described next. As is known, the posterior probability $p_p(l|v)$ is rewritten as follows by using Bayes' theorem.

$$p_p(l|v) = \frac{p_p(v|l)p_p(l)}{\Sigma_l p_p(v|l)p_p(l)} \quad (2)$$

That is, the posterior probability $p_p(l|v)$ can be calculated from a likelihood $p_p(v|l)$ of the feature amount v when the portion label at the position P is l and a prior probability $p_p(l)$ of the portion label l at the position p. The first region extraction unit 1040 obtains, for each pixel, $p_p(l)$ and $p_p(v|l)$ of each label l, and calculates $p_p(l|v)$ according to equation (2). In this case, the first region extraction unit 1040 can obtain the prior probability $p_p(l)$ of the label l of each pixel from the probabilistic atlas obtained as part of statistical data in step S2000.

Derivation processing of the likelihood $p_p(v|l)$ of each label l, which is necessary for the calculation of equation (2) described above, will be described lastly. As described with reference to step S2020, the input image and the probabilistic atlas have been aligned with each other. The first region extraction unit 1040 estimates, by using them, the likelihood $p_p(v|l)$ of the feature amount v when the portion label is l, that is, the gray level distribution of each portion. That is, the first region extraction unit 1040 calculates $p_p(v|l)$ by using the following equation:

$$p_p(v|l) = p_p(I_p|l) = \exp\left(-\frac{(I_p - I_l)^2}{2\sigma_l^2}\right) \quad (3)$$

where p represents the position of a pixel in the image, $I_p$ represents the gray level of the input image at the position p, and L represents a set of labels. In addition, parameters $I_l$ and $\sigma_l^2$ are distribution information (an average value and a variance value) of the gray levels in the region of the portion l. This distribution information is iteratively estimated by an EM (Expectation Maximization) algorithm (to be referred to as an EM algorithm hereinafter) by using the prior distribution obtained from the statistical data as an initial value. In this case, the closer the initial value of the distribution information to the actual distribution information of the input image, the more the estimation accuracy is improved. Since no phase information can be used at the time point of this step, the prior distribution of the portion l when the phase is unknown (that is, the average value $I_{l\_DB}$ and the variance value $\sigma_{l\_DB}^2$) is used as an initial value. However, since the MAP method which gives consideration to a probabilistic atlas as positional information is used, if the heart and the liver which exhibit small positional variations among patients are portions to be extracted, it is possible to perform favorable extraction even under the condition of ambiguous distribution information.

With the above processing, the regions of the first anatomical portions are extracted. Note that a method used for region extraction need not always be the MAP method. For example, it is possible to use the graph cut method or the Level Set method. In this case, when positional information such as a probabilistic atlas is added to the setting of a weight for each node in the graph cut method or zero level set (front) in the Level Set method, effects similar to those in this embodiment can be expected.

(Step S2050: Feature Amount Calculation)

In step S2050, the feature amount calculation unit 1050 calculates feature amounts concerning the gray levels in the regions of the first anatomical portions extracted in step S2040 from the regions. In this embodiment, the feature amount calculation unit 1050 calculates the average gray level of each of the regions of the first anatomical portions. Note that a feature amount to be calculated need not always be an average gray level. For example, it is possible to calculate the variance or maximum/minimum value of the gray levels in each region as a feature amount concerning the gray levels in each region. Alternatively, a combination of these values may be calculated as a feature amount.

(Step S2060: Phase Estimation)

In step S2060, the phase estimation unit 1060 estimates the phase of the input image by using the feature amounts concerning the gray levels calculated in step S2050. In this case, the phase estimation unit 1060 uses the average gray level in the respective phases of each first anatomical portion obtained as the statistical data in step S2000. That is, the phase estimation unit 1060 estimates a phase by comparing the feature amounts of the input image with the statistical data.

More specifically, the phase estimation unit 1060 calculates an evaluation value $D_t$ of each phase by using the following equation:

$$D_t = \Sigma_{l \in L'} |I_{l\_t\_DB} - I_{l\_in}| \qquad (4)$$

where t represents a phase, L' is a set of first anatomical portions, l is one of the first anatomical portions (the liver or heart in this embodiment), $I_{l\_t\_DB}$ represents an average value in the prior distribution of the gray levels in the portion l in the phase t, which is obtained as statistical data, and $I_{l\_in}$ is the average gray level of the portion l in the input image and the feature amount obtained in step S2050. That is, the evaluation value $D_t$ is the difference between the average gray level of the first anatomical portion and the prior distribution obtained when the phase is assumed to be t. This value is obtained as an L1 norm. The phase estimation unit 1060 calculates the value of the evaluation value $D_t$ with respect to each phase. The phase estimation unit 1060 then sets the phase t which gives the minimum evaluation value $D_t$ as a phase estimation result t*.

Note that the definition of the evaluation value $D_t$ is not limited to equation (4). For example, the L2 norm (square-root of sum of squares) of a prior distribution and an average gray level may be used. Alternatively, the Mahalanobis distance between an average gray level and a prior distribution which gives consideration to the variance values of the prior distribution may be used as the evaluation value $D_t$. Note that if a feature amount other than an average gray level is obtained in step S2050, a value corresponding statistical data may be prepared for each phase, and the difference between the feature amount and the prepared value may be evaluated. Note that if a plurality of feature amounts are used together, the sum of corresponding evaluation values may be used.

Note that a method of estimating a phase need not be the above calculation method. The gray level characteristics of the first anatomical portions in many cases including various phases may be learnt in advance, and an arbitrary classifier may be used, which estimates a phase by using the feature amount ($I_{l\_in}$) obtained in step S2050 as an input. For example, a phase may be identified by inputting a feature amount to a classifier such as a neural network or support vector machine.

Note that the phase information estimated in this step may be saved as accessory information of an input image held by the data server 110. If the header portion of an input image includes an item for holding phase information, in particular, the phase information may be recorded in the item.

(Step S2070: Second Region Extraction)

In step S2070, the second region extraction unit 1070 extracts the regions of second anatomical portions from the input image by using the phase information estimated in step S2060. First of all, the second region extraction unit 1070 selects the prior distribution (that is, an average value $I_{l\_t*\_DB}$ and a variance value $\sigma_{l\_t*\_DB}^2$) of the gray levels in each portion as proper statistical data based on the phase information t* estimated in step S2060. The second region extraction unit 1070 then extracts second regions by the same processing as that in step S2040 based on the selected prior distributions. Note that in actual processing in this step as in step S2040, the second region extraction unit 1070 extracts the regions of all portions including the same portions as the first anatomical portions. Note that as the regions of the first anatomical portions, the results in this step may be used or replaced with the results obtained in step S2040. Finally, the second region extraction unit 1070 outputs the extraction results of all the regions in the form of three-dimensional label images to the data server 110 and saves them in it.

(Step S2080: Display of Region Extraction Results)

In step S2080, the display control unit 1080 displays the regions of the respective portions extracted in step S2070 on the input image. In this embodiment, the display control unit 1080 superimposes and displays the slices of the label images obtained in step S2070 on a tomographic image of the input image designated by the user via a UI (User Interface) (not shown).

As described above, according to this embodiment, it is possible to perform highly accurate region extraction by estimating a phase even from an image in which phase information is lost or erroneously written.

(Modification 1-1)

In the above embodiment, it is estimated that a phase corresponds to one of the states, namely, "non-contrast enhancement", "early phase", "portal phase", and "late phase". However, phases may be classified into other categories concerning temporal changes in gray level in an image as long as the categories allow the selection of prior distributions. For example, a plurality of phases exhibiting similar distributions of gray levels may be integrated. For example, "early phase" and "late phase" may be integrated to estimate that a given phase belongs to one of "non-contrast enhancement", "portal phase", or "early phase or late phase". In addition, a state to be estimated need not always match a "phase" classified in the medical field, and may be properly defined based on variations in prior distribution.

In addition, a state to be estimated may be a continuous state such as an elapsed time since contrast material administration instead of a discrete state such as a "phase". In this case, the database 120 holds in advance, as statistical data, the prior distribution of the gray levels in each anatomical portion in the form of a function (prior distribution function) of an elapsed time since contrast material administration. In addition, the database 120 holds in advance a function (elapsed time function) of estimating an elapsed time since contrast material administration with the feature amount of gray levels in each first anatomical portion being an argument.

In this case, a prior distribution function is generated by obtaining a combination of an elapsed time and gray level distribution information in each case concerning each anatomical portion of image data of a plurality of cases which are captured in advance, and applying a function with a time being an explanatory variable and each of the average value and variance value of gray levels being an objective variable. In addition, an elapsed time function is generated by obtaining a combination of an elapsed time and the feature amount of gray levels in each of the portions (the liver and the heart) in each case concerning the first anatomical portions of image data of a plurality of cases which are captured in advance, and applying a function with each feature amount being an explanatory variable and a time being an objective variable.

In step S2060, the phase estimation unit 1060 performs the following processing instead of phase estimation. That is, the phase estimation unit 1060 estimates an elapsed time from the feature amount of gray levels calculated from a first region extraction result by using the above elapsed time function. In addition, in step S2070, the second region extraction unit 1070 estimates the prior distribution of the gray levels in each second anatomical portion by using the prior distribution function described above (of each second anatomical portion) based on the elapsed time obtained in step S2060. It is possible to perform second region extraction processing by using the prior distribution as an initial value.

(Modification 1-2)

In the processing in step S2070 according to the above embodiment, an average value and a variance value are obtained as the prior distribution of gray levels determined for each phase. However, it is not always necessary to obtain both an average value and a variance value in accordance with a phase. For example, only an average value may be obtained in accordance with a phase while a common fixed value is used as a variance value.

Second Embodiment

The first embodiment is configured to perform second region extraction by using phase information estimated from a first region extraction. In contrast to this, an image processing apparatus according to the second embodiment obtains the same effect without estimating any phase. The image processing apparatus according to this embodiment will be described mainly on differences from the first embodiment.

<Arrangement of Image Processing Apparatus>

Figure 4:
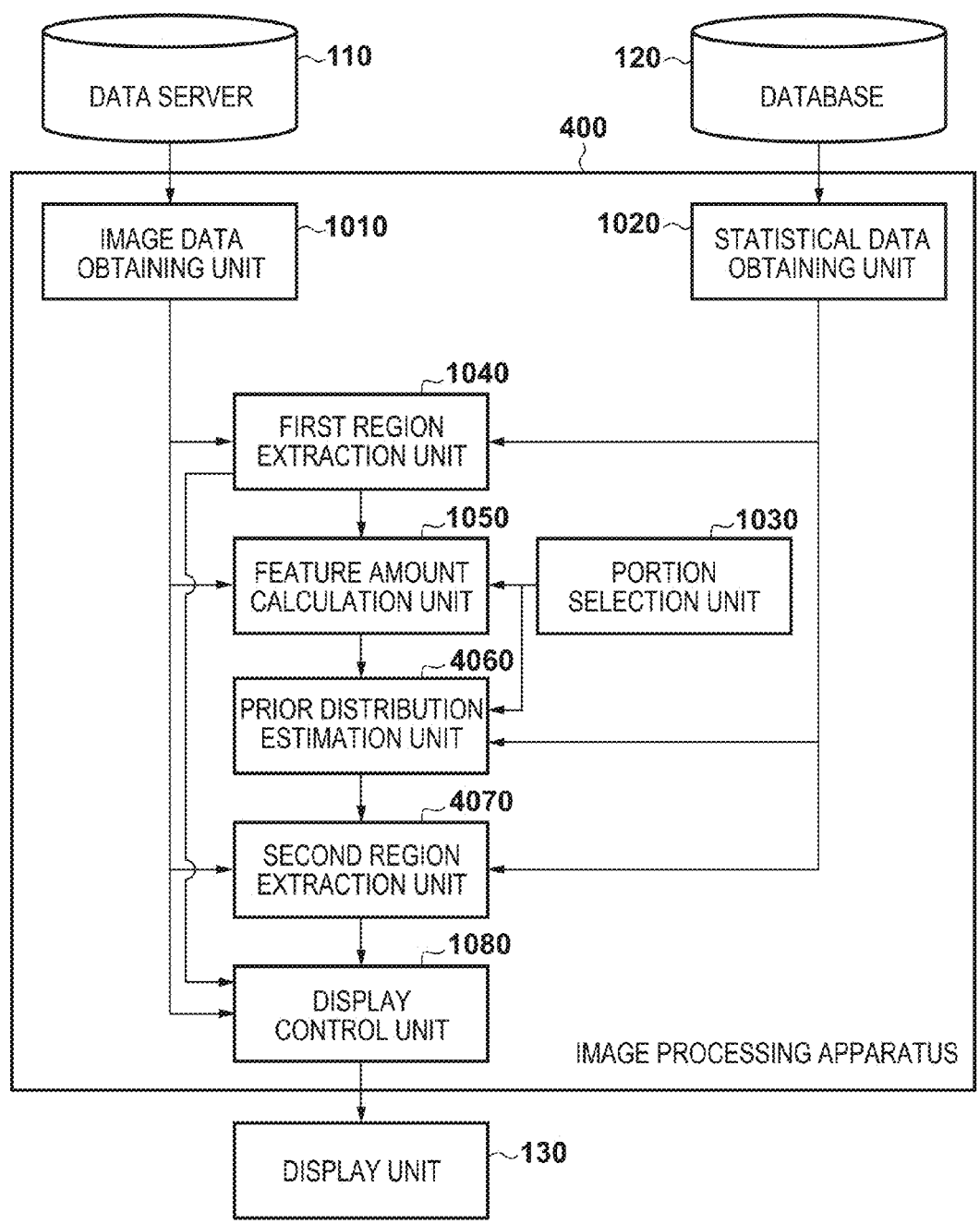
FIG. 4 is a block diagram showing an example of the arrangement of an image processing apparatus according to the second embodiment.

FIG. 4 shows an example of the arrangement of the image processing system according to this embodiment. The same reference numerals as those in the first embodiment denote the same components. That is, an image processing apparatus 400 according to this embodiment includes a prior distribution estimation unit 4060 instead of the phase estimation unit 1060 according to the first embodiment. In addition, processing performed by a second region extraction unit 4070 is different from that performed by the second region extraction unit 1070 according to the first embodiment. Other arrangements are the same as those of the first embodiment, and hence a description of them will be omitted.

The prior distribution estimation unit 4060 estimates the prior distribution of the gray levels in a second anatomical portion by using a feature amount concerning the gray levels in the first anatomical portion calculated by a feature amount calculation unit 1050. When performing this processing, the prior distribution estimation unit 4060 uses statistical data obtained by a statistical data obtaining unit 1020. The prior distribution estimation unit 4060 then outputs the information of the estimated prior distribution to the second region extraction unit 4070.

Statistical data in this embodiment includes a function which associates the prior distribution (the average value and variance value) of the gray levels in each second anatomical portion with a feature amount concerning the gray levels in the first anatomical portion. This function has the role of a correspondence table which receives a feature amount concerning the gray levels in a first anatomical portion as an argument and then returns the prior distribution of the gray levels in a second anatomical portion. Like a probabilistic atlas, this function is generated by the image data of each of many cases captured in advance and manually generated label images representing anatomical portions.

In this embodiment, first of all, the distribution information (the average value and variance value) of the gray levels in each anatomical portion is calculated by using image data and a label image. A feature amount space is then defined, with the feature amounts of gray levels in the liver and the heart as first anatomical portions being assigned to axes. Finally, this function is generated by applying a function with the distribution information of the gray levels in each second anatomical portion being an objective variable and the feature amount of gray levels in each first anatomical portion being an explanatory variable.

The second region extraction unit 4070 extracts the region of each second anatomical portion from the input image by using the prior distribution of the gray levels in the second anatomical portion estimated by the prior distribution estimation unit 4060. The second region extraction unit 4070 outputs the information of the extracted second region to a display control unit 1080.

<Processing by Image Processing Apparatus>

Figure 5:
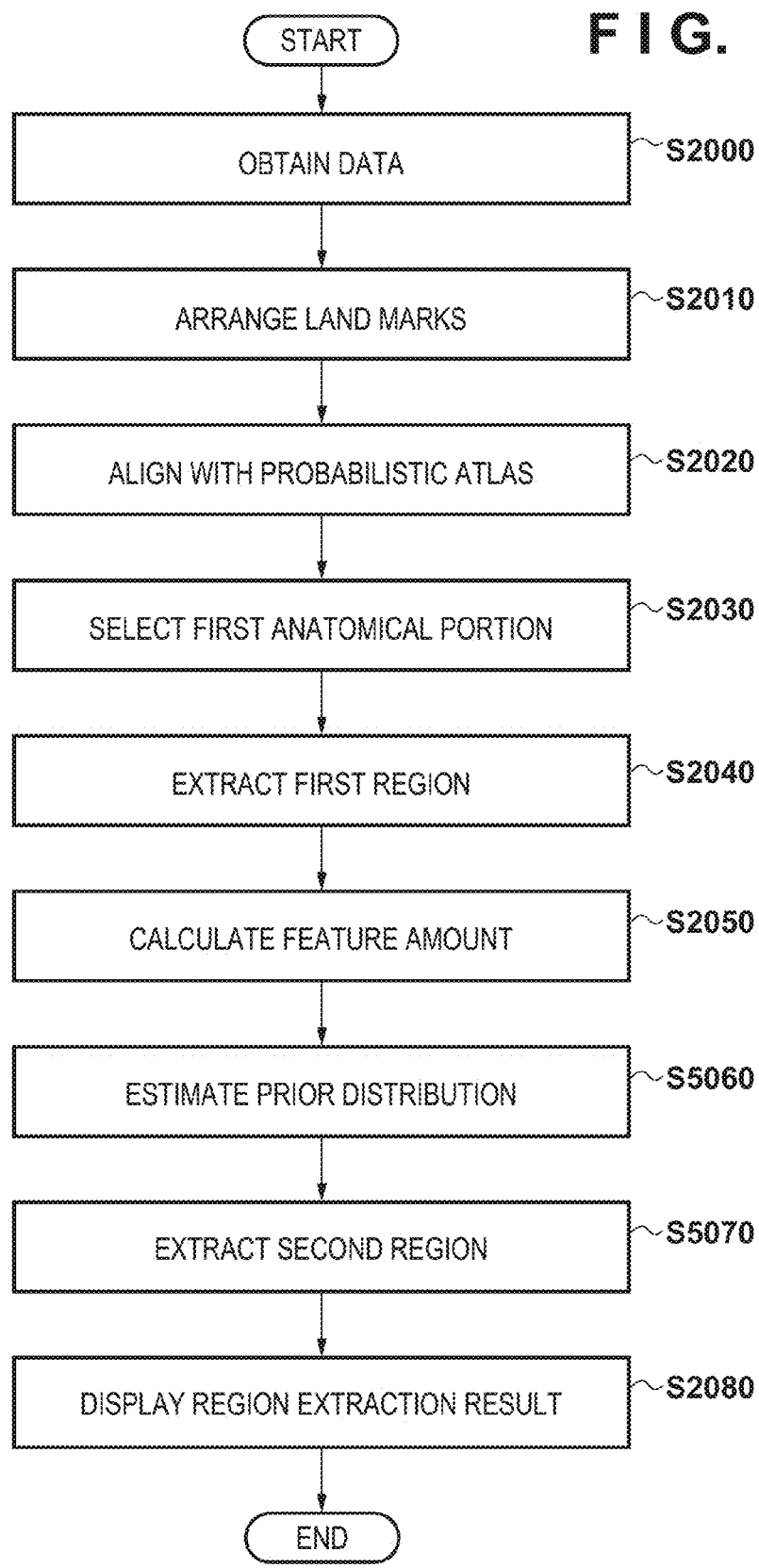
FIG. 5 is a flowchart showing an overall processing procedure executed by the image processing apparatus according to the second embodiment.

FIG. 5 is a flowchart showing an overall processing procedure executed by the image processing apparatus 400 according to this embodiment. Note that processing performed by each unit in steps S2000 to S2050 and S2080 is the same as that in the first embodiment.

(Step S5060: Estimation of Prior Distribution)

In step S5060, the prior distribution estimation unit 4060 estimates the prior distribution of the gray levels in the second anatomical portion by using a feature amount concerning the gray levels in the first anatomical portion calculated in step S2050. More specifically, the prior distribution estimation unit 4060 obtains the values of a prior distribution by inputting the feature amount concerning the gray levels in the first anatomical portion to each gray level function representing the prior distribution of the second anatomical portion.

(Step S5070: Second Region Extraction)

In step S5070, the second region extraction unit 4070 extracts the region of each second anatomical portion from the input image by using the prior distribution of the gray levels in the second anatomical portion estimated in step S5060. Processing in this step is the same as that in step S2040. Note however that this processing differs from that in step S2040 only in that it uses the prior distribution estimated in step S5060.

As described above, according to this embodiment, using feature amount spaces makes it possible to perform classification more finely than phases, thereby enabling more accurate parameter selection.

As described above, according to the first and second embodiments, even if image data has a deficit or error in phase information, the phase of an image or the prior distribution of the gray levels in each anatomical portion can be estimated. Using the estimation result can improve the accuracy of subsequent image processing.

Third Embodiment

As described in "BACKGROUND OF THE INVENTION", at different elapsed times since the administration of a contrast material, even the same anatomical portion exhibits different degrees of contrast enhancement. For this reason, for example, in the image processing of extracting the regions of anatomical portions, when processing images in various phases as processing targets, accurate extraction cannot sometimes be performed by using one image processing parameter. International Publication No. 2011/125369 discloses a technique of setting parameters used for a region expansion method and a dynamic contour method based on image capturing times obtained from the header portions of medical images saved in accordance with the DICOM (Digital Imaging and Communication in Medicine) standards.

It is, however, impossible to accurately extract regions from medical images used in real clinical practices by using simple region extraction methods such as a region expansion method and a dynamic contour method. For this reason, the third and fourth embodiments provide techniques of improving the accuracy of the region extraction processing of extracting target regions existing in medical images in various phases.

<Overview>

The image processing apparatus according to this embodiment extracts the region of a predetermined anatomical portion (an anatomical portion as an extraction target) of an object, such as an organ or a lesion portion, from a medical image (input image) input to the apparatus. This apparatus is featured to estimate phase information (for example, "non-contrast enhancement", "early phase", "portal phase", or "late phase") from the input image at this time and then calculate the belongingness degree of each pixel of the input image based on the estimated phase information. In this case, the belongingness degree is a value representing that the corresponding pixel belongs to a specific one of anatomical portions as extraction targets. In the subsequent region extraction processing, a region corresponding to an anatomical portion as an extraction target is extracted from an input image by using the belongingness degree calculated based on phase information. Using such methods makes it possible to properly extract an anatomical portion as an extraction target regardless of the phase of an input image.

A region in an input image which corresponds to an anatomical portion has a characteristic enhancement pattern in accordance with the elapsed time since contrast material administration. The image processing apparatus according to this embodiment estimates the phase information of the input image based on this enhancement pattern. For this reason, the apparatus extracts an anatomical portion first. However, in the stage of obtaining phase information from the input image, the apparatus cannot use the belongingness degree (obviously either phase information), and hence cannot extract a region corresponding to an anatomical portion with high accuracy. The image processing apparatus according to the embodiment therefore selects anatomical portions statistically exhibiting small positional variations among patients as anatomical portions for phase estimation. The apparatus then extract the portions by a region extraction method with importance being placed on positional information (which can be executed even if the prior distributions of gray levels are ambiguous). The apparatus obtains, from the regions of the anatomical portions for phase estimation obtained by such an extraction method, gray level distribution information in the regions as image feature amounts for phase estimation. The apparatus then estimates the phase of the image based on this gray level distribution information.

Subsequently, the image processing apparatus calculates the belongingness degree of each pixel based on the estimated phase information. A belongingness degree in this embodiment is a value representing that each pixel (or a region constituted by a plurality of pixels) in an input image is part of a specific one of anatomical portions as extraction targets, and is calculated by comparing the pixel value of each pixel (or a region) with a reference value. Such a method of calculating a belongingness degree based on a pixel value needs to properly select a reference value as a comparison target for each anatomical portion as an extraction target in accordance with the phase of an input image. For this reason, in this embodiment, a reference value for the calculation of belongingness degrees is selected based on the phase information of an input image. The belongingness degree of each pixel is then calculated based on the selected reference value.

In the processing of extracting a region corresponding to an anatomical portion as an extraction target from an input image, region extraction is executed based on calculated belongingness degrees. Any method can be used for region extraction as long as the method is designed to use belongingness degrees. Using belongingness degrees calculated based on a phase makes it possible to favorably extract a region corresponding to an anatomical portion as an extraction target regardless of the state of the phase of an input image.

The following description will exemplify the image processing apparatus according to this embodiment in a case in which a three-dimensional image of the thoracoabdominal portion of an object is a processing target. The following description concerns a case in which the apparatus extracts, from an image, the regions of the liver, heart, left kidney, right kidney, and spleen as anatomical portions. In addition, the regions of organs, soft tissue, air, and the like other than anatomical portions of current interest (that is, the liver, heart, left kidney, right kidney, and spleen) are regarded as one anatomical portion for the sake of convenience, and will be referred to as "the other anatomical portion" hereinafter. In this embodiment, "the other anatomical portion" is added as one of anatomical portions as extraction targets.

Of the above anatomical portions, the liver and heart each have the property of exhibiting small positional variations among patients. That is, even if a phase is unknown, these portions allow easy extraction. In addition, these two portions have different temporal enhancement patterns (the contrast peak of the heart is earlier than that of the liver). That is, it is possible to stably estimate a phase by combining the pieces of distribution information of the gray levels in the two regions. In consideration of the above properties, this embodiment is configured to select the liver and heart as anatomical portions for phase estimation.

In this specification, anatomical portions as extraction targets will be expressed as a set L, and anatomical portions to be referred to obtain phase information will be expressed as $L_f$. In addition, the liver, heart, left kidney, right kidney, spleen, and "the other anatomical portion" will be expressed as labels, namely, liver, heart, lkidney, rkidney, spleen, and others, respectively. That is, L={liver, heart, lkidney, rkidney, spleen, others}, and $L_f$={liver, heart}. Note that in this specification, anatomical portions (the liver, heart, left kidney, right kidney, and spleen) in an actual human body one-to-one correspond to anatomical portions (liver, heart, lkidney, rkidney, and spleen in label values) to be considered in the image processing apparatus. However, if one anatomical portion in the same phase has a plurality of different image features, the anatomical portion can be made to correspond to a plurality of virtual anatomical portions. If, for example, the liver includes a portion with a bright gray level and a portion with a dark gray level or the liver has an abnormal region such as a tumor, the liver is represented as two virtual anatomical portions, namely, liver1 and liver2 (the label values are liver1 and liver2). In this case, after both liver1 and liver2 are added to L, the following processing is executed. This makes it possible to extract both the bright and dark portions of the liver region with high accuracy. The same applies to other anatomical portions.

This specification will exemplify a region extraction method using the graph cut method described in U.S. Pat. No. 6,937,212 as a region extraction method using belongingness degrees. As described above, however, the region extraction method to be used is not limited to the graph cut method. Other region extraction methods, for example, the Level set method and Superpixel method, can be used as long as they are region extraction methods using belongingness degrees.

The arrangement of the image processing system and its processing will be described below with reference to FIGS. 6 to 10.

<Arrangement of Image Processing System>

Figure 6:
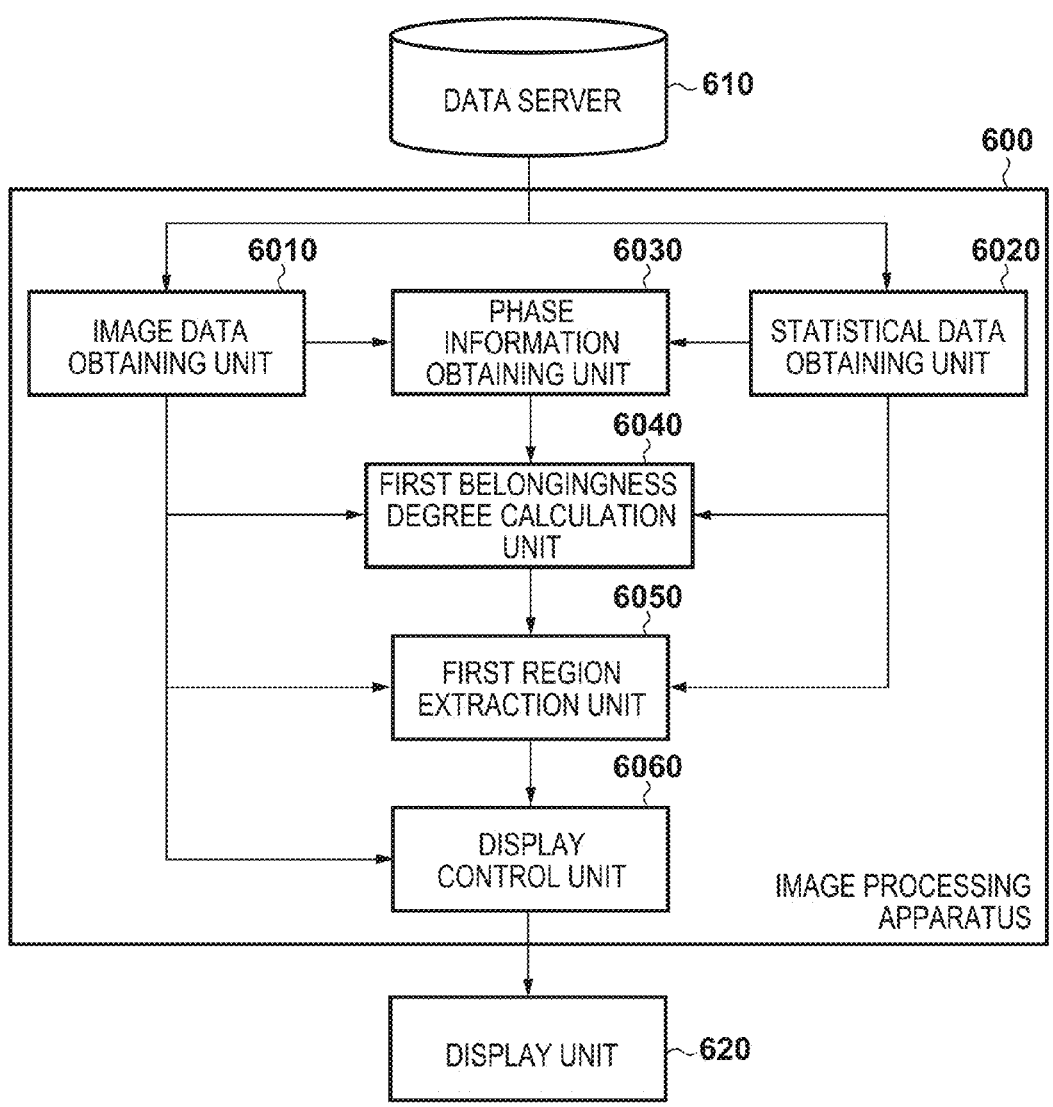
FIG. 6 is a block diagram showing an example of the arrangement of an image processing apparatus according to the third embodiment.

FIG. 6 shows an example of the arrangement of an image processing system according to this embodiment. As shown in FIG. 6, an image processing apparatus 600 according to the embodiment is connected to a data server 610 and a display unit 620.

The data server 610 holds, as image data, three-dimensional tomographic images (volume data) obtained in advance by capturing images of objects under certain conditions (modalities, image capturing modes, dates and times, body postures, and the like). Modalities for capturing three-dimensional tomographic images may include an MRI (Magnetic Resonance Imaging) apparatus, X-ray CT (Computed Tomography) apparatus, three-dimensional ultrasonic imaging apparatus, photoacoustic tomography apparatus, and PET/SPECT apparatus. In this case, PET is an abbreviation for positron emission tomography, and SPECT is an abbreviation for single photon emission computed tomography. These three-dimensional tomographic images include images each having one slice, that is, two-dimensional images. Image data is input to the image processing apparatus 600 via an image data obtaining unit 6010.

The database 610 holds statistical data used for extraction processing. Statistical data is input to the image processing apparatus 600 via a statistical data obtaining unit 6020. The details of statistical data will be described later.

The display unit 620 is a liquid crystal monitor or the like, and displays various types of information such as a display image generated by the image processing apparatus 600. The display unit 620 is also provided with a GUI (Graphical User Interface) for obtaining instructions from the user.

<Arrangement of Image Processing Apparatus 600>

The image processing apparatus 600 is constituted by constituent elements described below. The image data obtaining unit 6010 obtains, from the data server 610, image data (input image) to be input to the image processing apparatus 600. The image data obtaining unit 6010 then outputs the obtained input image to a phase information obtaining unit 6030, a first belongingness degree calculation unit 6040, a first region extraction unit 6050, and a display control unit 6060.

The statistical data obtaining unit 6020 obtains, from the data server 610, statistical data to be input to the image processing apparatus 600. The statistical data obtaining unit 6020 outputs the obtained statistical data to the phase information obtaining unit 6030, the first belongingness degree calculation unit 6040, and the first region extraction unit 6050.

The phase information obtaining unit 6030 estimates phase information concerning an input image. This processing unit performs the image obtaining processing of obtaining an input image from the image data obtaining unit 6010. In addition, the processing unit receives statistical data from the statistical data obtaining unit 6020. The unit then estimates the phase information of the input image based on the obtained statistical data. At this time, the unit extracts the regions of the anatomical portions for phase estimation from the input image, and estimates phase information by referring to the image information of the regions. The phase information obtained by the processing unit is output to the first belongingness degree calculation unit 6040.

The first belongingness degree calculation unit 6040 calculates the belongingness degree of each pixel in the input image by using the statistical data obtained from the statistical data obtaining unit 6020 and the phase information estimated by the phase information obtaining unit 6030. In this case, a belongingness degree is calculated for each portion as an extraction target. That is, the first belongingness degree calculation unit 6040 calculates belongingness degrees equal in number to the number of anatomical portions as extraction targets with respect to one pixel in the input image. The first belongingness degree calculation unit 6040 outputs the calculated belongingness degrees to the first region extraction unit 6050.

The first region extraction unit 6050 extracts a region belonging to an anatomical portion as an extraction target from the input image by referring to the statistical data obtained by the statistical data obtaining unit 6020 and the belongingness degrees calculated by the first belongingness degree calculation unit 6040. That is, the first region extraction unit 6050 decides a portion to which each pixel in the input image belongs. The first region extraction unit 6050 outputs the information of extracted region to the display control unit 6060. The display control unit 6060 controls the display unit 620 to display the input image and each region extraction result in accordance with an input from an operation unit (not shown) operated by the user.

Figure 8:
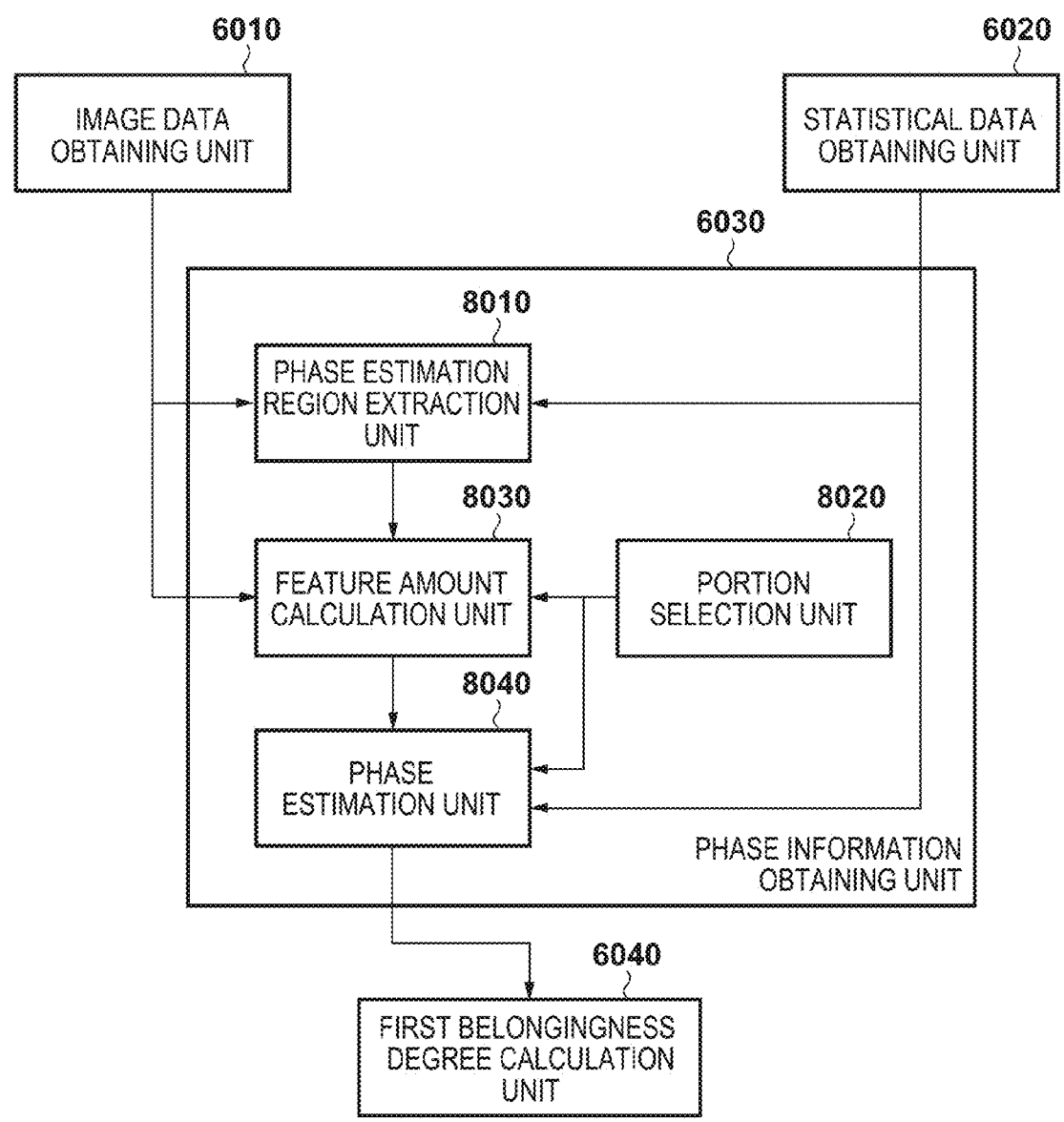
FIG. 8 is a block diagram showing an example of the arrangement of a phase information obtaining unit according to the third embodiment.
Figure 9:
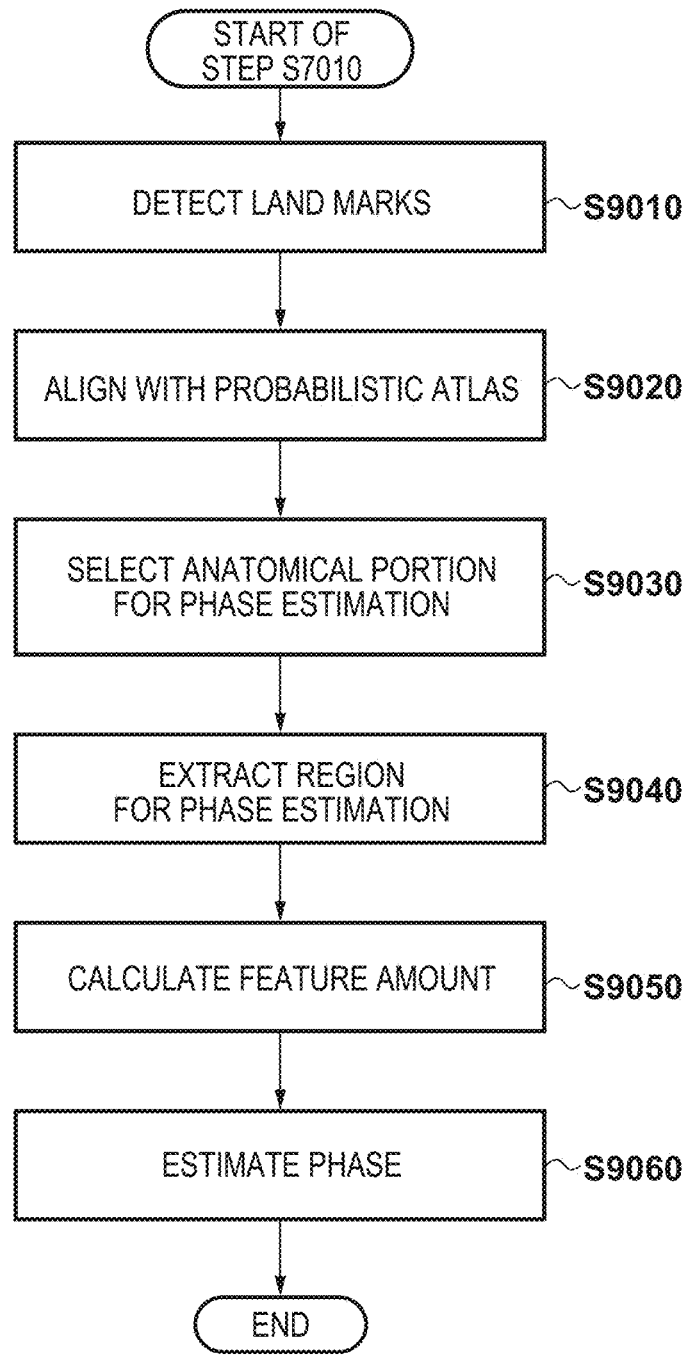
FIG. 9 is a flowchart showing a processing procedure executed by the phase information obtaining unit according to the third embodiment.

FIG. 8 is a block diagram showing the functional arrangement of the phase information obtaining unit 6030. The phase information obtaining unit 6030 includes a phase estimation region extraction unit 8010, a portion selection unit 8020, a feature amount calculation unit 8030, and a phase estimation unit 8040.

The phase estimation region extraction unit 8010 extracts the regions of anatomical portions for phase estimation (regions for phase estimation) from an input image. The phase estimation region extraction unit 8010 uses statistical data obtained by the statistical data obtaining unit 6020 for this processing. The portion selection unit 8020 then selects anatomical portions for phase estimation. The portion selection unit 8020 outputs the information of the selected portions to the feature amount calculation unit 8030 and the phase estimation unit 8040. The feature amount calculation unit 8030 calculates feature amounts concerning the gray levels in the anatomical portions for phase estimation (feature amounts for phase estimation) by using the information of the regions for phase estimation extracted by the phase estimation region extraction unit 8010 (feature amount processing). The feature amount calculation unit 8030 then outputs the calculated feature amounts to the phase estimation unit 8040.

The phase estimation unit 8040 estimates a state concerning a temporal change in gray level, for example, a phase (for example, "non-contrast enhancement", "early phase", "portal phase", or "late phase") at the time of contrast material-enhancement for the input image, by using the feature amounts concerning the gray levels calculated by the feature amount calculation unit 8030. The phase estimation unit 8040 uses the statistical data obtained by the statistical data obtaining unit 6020 for this processing. The phase estimation unit 8040 then outputs the information of the estimated phase to the first belongingness degree calculation unit 6040.

Statistical data held by the data server 610 will be described below. Statistical data includes a probabilistic atlas, a shape model, and the prior distribution of the gray levels in anatomical portions as extraction targets.

A probabilistic atlas indicates the probability (existence probability) at which the position of each pixel belongs to a specific anatomical portion in a standardized image of an object. A probabilistic atlas is generated by the following procedure. First of all, mask images representing the regions of anatomical portions are manually generated with respect to the image data of each of many cases captured in advance. In this case, a mask image is a binary image with pixels included in the region of an anatomical portion in the image and other pixels having different pixel values. This embodiment uses six mask images of the heart, liver, right kidney, left kidney, spleen, and the other anatomical portion". Note that the other anatomical portion" can be generated from the remaining five mask images.

Image spaces between the respective cases are standardized, and the mask images are superimposed on each other. With this processing, at each pixel, the existence probability of each portion can be calculated from the number of masks superimposed. An image made to have the calculated existence probabilities as pixel values is a probabilistic atlas. Note that space standardization can be performed by processing similar to that in steps S9010 and S9020 described later. This makes possible to perform both space standardization at the time of generating an atlas and space standardization for an input image and a probabilistic atlas by using the same algorithm.

A shape model is a model representing the shape of an anatomical portion as an extraction target. A shape model used in this embodiment is expressed by using a level set distribution model. A shape expression using a level set distribution model is a known technique in the field of image processing, and hence a description of the details of the method will be omitted. Like a probabilistic atlas, a shape model is generated in advance. The following is a generation procedure. Note that one shape model is generated for each of anatomical portions as extraction targets.

The following description is a procedure for generating a shape model corresponding to one anatomical portion as an extraction target. A shape model is generated by using mask images of a plurality of objects. This procedure uses the same mask images as those (spatially standardized mask images) used for the generation of a probabilistic atlas. First of all, signed distance transformation is applied to each of a plurality of spatially standardized mask images to generate distance images. An image obtained by signed distance transformation is an image in which a distance value from a boundary of the region of an anatomical portion to each pixel corresponding to the region in a mask image is stored as a positive value, whereas a distance value from the boundary to each pixel outside the region is stored as a negative value. Each generated distance image is then transformed into one multidimensional vector.

As a result, multidimensional vectors are generated, which one-to-one correspond to the respective mask images. Principal component analysis is applied to a set of multidimensional vectors obtained in this manner to obtain one average value vector and a plurality of eigenvectors. Assume that this average value vector and the respective eigenvectors are an average shape (image) of a shape model expressed by a level set distribution model and eigenshapes (images). Such procedure is executed for each of anatomical portions as extraction targets to obtain shape models of all the anatomical portions.

The prior distributions of the gray levels in anatomical portions as extraction targets one-to-one correspond to phases estimated by the phase information obtaining unit 6030. In addition, the prior distribution of gray levels to be used when a phase is unknown is stored for each portion. This embodiment will exemplify a case in which a Gaussian distribution is assumed to be the prior distribution of gray levels, and an average value and a variance value are held.

In the following description, the prior distribution of the gray levels in an anatomical portion l in a phase t is represented by an average value $I_{l\_t\_DB}$ and a variance value $\sigma_{l\_t\_DB}^2$. In addition, the prior distribution of the gray levels in the anatomical portion l to be used when a phase is unknown is represented by an average value $I_{l\_DB}$ and a variance value $\sigma_{l\_DB}^2$. In this case, the prior distribution of gray levels is calculated from label images of a plurality of cases used for the generation of a probabilistic atlas. That is, the average value and variance value of the gray levels in the region of each portion in all the cases in the same phase are obtained as the prior distribution of the gray levels in the portion in the phase.

In addition, the average of prior distributions in each phase (the average of average values and the average of variance values) is obtained as the prior distribution of the gray levels in the portion when a phase is unknown. Note that a prior distribution in one of phases may be used as a substitute for a prior distribution when a phase is unknown. In this case, the prior distribution in any specific phase to be used can be determined by a preliminary experiment using the image data of a plurality of cases included in the database 610. In this embodiment, when a phase is unknown, a prior distribution in a portal phase is used.

Note that a prior distribution to be used when a phase is unknown may be obtained by other methods. For example, the average value and variance value of the gray levels in the region of each portion in all the cases without any limitation in terms of phase are obtained. The obtained values may be defined as the prior distribution of the gray levels in the portion when a phase is unknown. In this case, since the statistics of gray levels in all the phases are obtained, the variance becomes larger than that when statistics are obtained for each phase. As a consequence, when a phase is unknown, it is possible to execute estimation with higher importance being placed on positional information based on a probabilistic atlas than the prior distribution of gray levels.

<Processing by Image Processing Apparatus 600>

Figure 7:
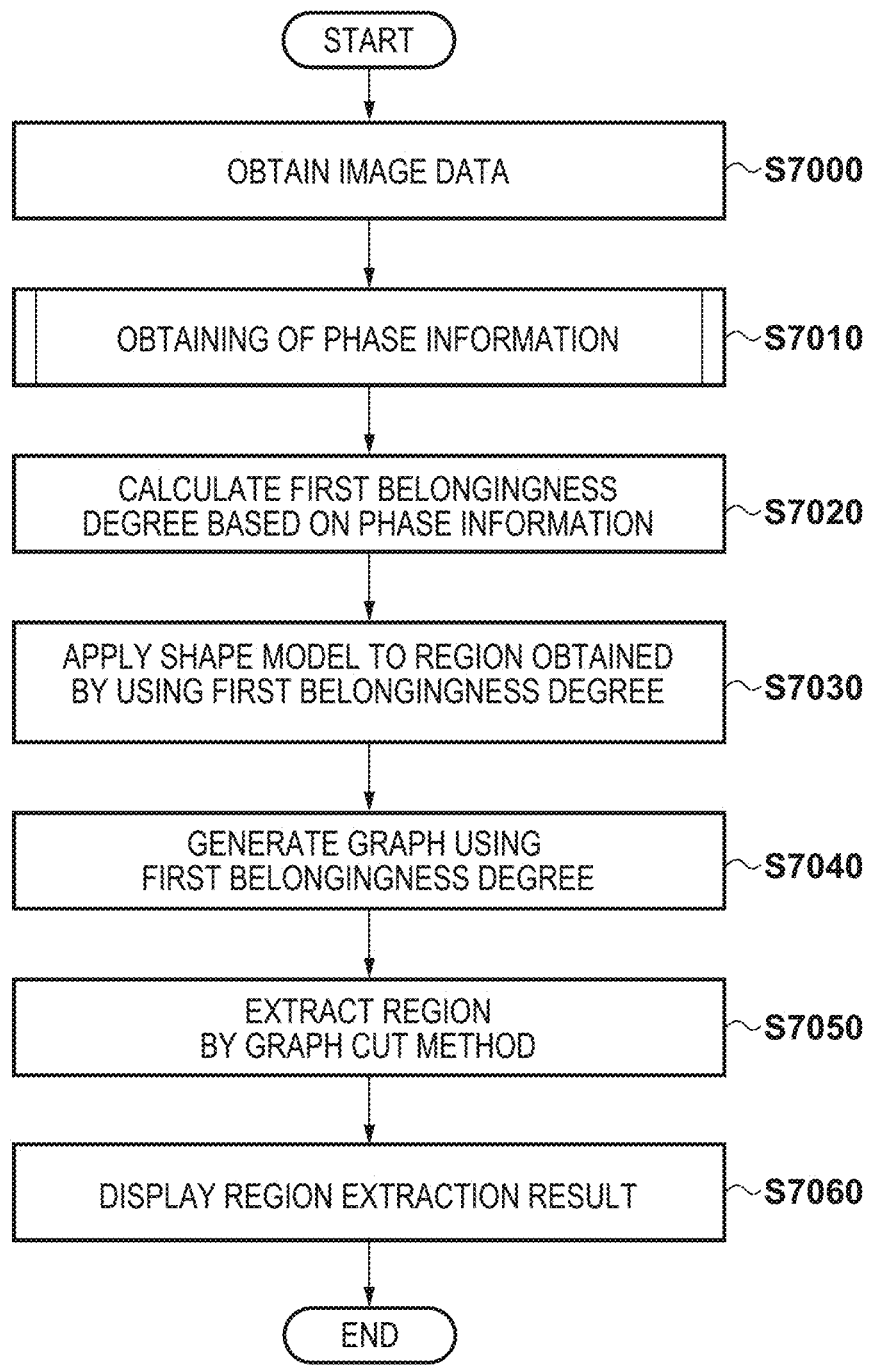
FIG. 7 is a flowchart showing an overall processing procedure executed by the image processing apparatus according to the third embodiment.

FIG. 7 is a flowchart showing an overall processing procedure executed by the image processing apparatus 600 according to this embodiment.

(Step S7000: Obtaining of Data)

In step S7000, the image data obtaining unit 6010 obtains, from the data server 610, an input image as a processing target. In addition, the statistical data obtaining unit 6020 obtains statistical data from the data server 610.

(Step S7010: Obtaining of Phase Information)

In step S7010, the phase information obtaining unit 6030 estimates the phase information of the input image. The details of processing performed by the phase information obtaining unit 6030 will be described below with reference to the flowchart of FIG. 9.

(Step S9010: Arranging of Land Marks)

In step S9010, the phase estimation region extraction unit 8010 arranges land marks on the input image obtained in step S7000. These land marks are used to align a probabilistic atlas with the input image in a subsequent process. In this embodiment, the phase estimation region extraction unit 8010 extracts a lung region and a pelvis region from the input image by threshold processing, and arranges land marks based on the barycentric position of each region.

More specifically, first of all, the phase estimation region extraction unit 8010 finds an axial slice including the barycenter of the extracted lung region and an axial slice including the barycenter of the extracted pelvis region. This unit then extracts body surfaces from the axial slices by threshold processing. Finally, the unit moves a search point vertically and horizontally on each axial slice, and arranges land marks at positions where the search point comes into contact with the body surface.

A schematic view of the input image on which the land marks are arranged is the same as that described with reference to FIG. 3 in the first embodiment.

(Step S9020: Alignment with Probabilistic Atlas)

In step S9020, the phase estimation region extraction unit 8010 aligns the probabilistic atlas stored in the database 610 with the input image by using the land marks arranged in step S9010. In this embodiment, the land marks arranged in step S9010 are made to correspond to the land marks on the probabilistic atlas. A deformation field is generated by using RBF (Radial Basis Function) as one of typical deformation models to deform the probabilistic atlas in accordance with the input image. This can remove the bias caused by the patient from the position of each anatomical portion. Note that a technique used for image deformation need not always be RBF. For example, it is possible to use FFD (Free Form Deformation) as one of typical deformation models.

(Step S9030: Selection of Anatomical Portions for Phase Estimation)

In step S9030, the portion selection unit 8020 selects anatomical portions for phase estimation from anatomical portions as extraction targets of the image processing apparatus 600. In this embodiment, for the above reason, the heart and the liver are selected as anatomical portions for phase estimation. Note that anatomical portions for phase estimation may be adaptively selected in accordance with an input image. For example, the portion selection unit 8020 may determine, based on the result of alignment with the probabilistic atlas obtained in step S9020, whether the heart and the liver as candidate portions are included in the input image, and may select only the portion included in the input image as an anatomical portion for phase estimation.

(Step S9040: Extraction of Regions for Phase Estimation)

In step S9040, the phase estimation region extraction unit 8010 extracts the regions of the anatomical portions for phase estimation selected in step S9030 from the input image. This embodiment uses, as a region extraction method, the MAP (Maximum a Posterior Probability) method disclosed in Hyunjin Park, Peyton H. Bland, Charles R. Meyer "Construction of an Abdominal Probabilistic Atlas and its Application in Segmentation", IEEE Transactions on Medical Imaging, Vol. 22, No. 4, April 2003. The MAP method is a method of assigning a portion label exhibiting the maximum posterior probability to each pixel based on a feature amount v (a gray level in this case) observed in each pixel. Each portion label is expressed as follows:

$$\hat{l}_p = \mathrm{argmax}_{l \in L} p_p(l|v) \quad (5)$$

where L is a set of labels assigned to anatomical portions as extraction targets, l is one of the labels, v is a gray level, and $p_p(l|v)$ is the posterior probability of the label l at a position p. The phase estimation region extraction unit 8010 obtains the posterior probability $p_p(l|v)$ of each label l with respect to each pixel, and decides the label of each pixel according to equation (5). Although the purpose of processing performed by the phase estimation region extraction unit 8010 in this step is to extract the regions of anatomical portions for phase estimation, actual processing is performed so as to execute region extraction of all anatomical portions including anatomical portions for phase estimation.

Derivation processing of the posterior probability $p_p(l|v)$ of each label l, which is necessary for the calculation of equation (5) described above, will be described next. As is known, the posterior probability $p_p(l|v)$ is rewritten as follows by using Bayes' theorem.

$$p_p(l|v) = \frac{p_p(v|l)p_p(l)}{\Sigma_l p_p(v|l)p_p(l)} \quad (6)$$

That is, the posterior probability $p_p(l|v)$ can be calculated from a likelihood $p_p(v|l)$ of the feature amount v when the portion label at the position p is l and a prior probability $p_p(l)$ of the portion label l at the position p. The first region extraction unit 6050 obtains $p_p(l)$ and $p_p(v|l)$ of each label l, and calculates $p_p(l|v)$ according to equation (6). In this case, the first region extraction unit 6050 can obtain the prior probability $p_p(l)$ of the label l of each pixel from the probabilistic atlas obtained as part of statistical data in step S7000.

Derivation processing of the likelihood $p_p(v|l)$ in each label l, which is necessary for the calculation of equation (6) described above, will be described lastly. As described with reference to step S9020, the input image and the probabilistic atlas have been aligned. The phase estimation region extraction unit 8010 estimates, by using them, the likelihood $p_p(v|l)$ of the feature amount v when the portion label is l, that is, the gray level distribution of each portion. That is, the phase estimation region extraction unit 8010 calculates $p_p(v|l)$ by using the following equation:

$$p_p(v|l) = p_p(I_p|l) = \exp\left(-\frac{(I_p - I_l)^2}{2\sigma_l^2}\right) \quad (7)$$

where p represents the position of a pixel in the image, $I_p$ represents the gray level of the input image at the position p, and L represents a set of labels. In addition, parameters $I_l$ and $\sigma_l^2$ are distribution information (the average value and variance value) of the gray levels in the region of the portion l. This distribution information is iteratively estimated by an EM (Expectation Maximization) algorithm (to be referred to as an EM algorithm hereinafter) by using the prior distribution obtained from the statistical data as an initial value. In this case, the closer the initial value of the distribution information to the actual distribution information of the input image, the more the estimation accuracy is improved. Since no phase information can be used at the time point of this step, the prior distribution of the portion l when the phase is unknown (that is, the average value $I_{l\_DB}$ and the variance value $\sigma_{l\_DB}^2$) is used as an initial value. However, since the MAP method which gives consideration to a probabilistic atlas as positional information is used, if the heart and the liver which exhibit small positional variations among patients are portions to be extracted, it is possible to perform favorable extraction even under the condition of ambiguous distribution information.

With the above processing, the regions of the anatomical portions for phase estimation are extracted. Note that a method used for region extraction need not always be the MAP method. For example, it is possible to use the graph cut method or the Level Set method. In this case, when positional information such as a probabilistic atlas is added to the setting of a weight for each node in the graph cut method or zero level set (front) in the Level Set method, effects similar to those in this embodiment can be expected.

(Step S9050: Feature Amount Calculation for Phase Estimation)

In step S9050, the feature amount calculation unit 8030 calculates feature amounts (feature amounts for phase estimation) concerning the gray levels in the regions of the anatomical portions for phase estimation extracted in step S9040 from the regions. In this embodiment, the feature amount calculation unit 8030 calculates the average gray level of each of the regions of the anatomical portions for phase estimation. Note that a feature amount to be calculated need not always be an average gray level. For example, it is possible to calculate the variance or maximum/minimum value of the gray levels in each region as a feature amount concerning the gray levels in each region. Alternatively, a combination of these values may be calculated as a feature amount.

(Step S9060: Phase Estimation)

In step S9060, the phase estimation unit 8040 estimates the phase of the input image by using the feature amounts for phase estimation calculated in step S9050. In this case, the phase estimation unit 8040 uses an average gray level in each anatomical portion for phase estimation, in each phase, obtained as the statistical data in step S7000. That is, the phase estimation unit 8040 estimates a phase by comparing the feature amounts of the input image with the statistical data. More specifically, the phase estimation unit 8040 calculates an evaluation value $D_t$ in each phase by using the following equation:

$$D_t = \Sigma_{l_t \in L_t} |I_{l_t\_t\_DB} - I_{l_t\_in}| \quad (8)$$

where t represents a phase, $L_t$ is a set of anatomical portions for phase estimation, $l_t$ is one of the anatomical portions (the liver or heart in this embodiment), $I_{l_t\_t\_DB}$ represents an average value in the prior distribution of the gray levels in the portion $l_t$ in the phase t, and $I_{l_t\_in}$ is the average gray level of the portion $l_t$ in the input image and the feature amount obtained in step S9050. That is, the evaluation value $D_t$ is the difference between the average gray level of the anatomical portion for phase estimation and the prior distribution obtained when the phase is assumed to be t. This value is obtained as an L1 norm. The phase estimation unit 8040 calculates the value of the evaluation value $D_t$ with respect to each phase. The phase estimation unit 8040 then sets the phase t which gives the minimum evaluation value $D_t$ as a phase estimation result t*.

Note that the definition of the evaluation value $D_t$ is not limited to equation (8). For example, the L2 norm (square-root of sum of squares) of a prior distribution and an average gray level may be used. Alternatively, the Mahalanobis distance between an average gray level and a prior distribution which gives consideration to the variance value of the prior distribution may be used as the evaluation value $D_t$. Note that if a feature amount other than an average gray level is obtained in step S9050, a value corresponding statistical data may be prepared for each phase, and the difference between the feature amount and the prepared value may be evaluated. Note that if a plurality of feature amounts are used together, the sum of corresponding evaluation values may be used.

Note that a method of estimating a phase need not be the above calculation method. The gray level characteristics of the anatomical portions for phase estimation in many cases including various phases may be learnt in advance, and an arbitrary classifier may be used, which estimates a phase by using the feature amount ($I_{l1\_in}$) obtained in step S9050 as an input. For example, a phase may be identified by inputting a feature amount to a classifier such as a neural network or support vector machine.

Note that the phase information estimated in this step may be saved as accessory information of an input image held by the data server 610. If the header portion of an input image includes an item for holding phase information, in particular, the phase information may be recorded in the item.

This is the end of the description of step S7010.

(Step S7020: Calculation of Belongingness Degree (First Belongingness Degree) to Each Organ)

In step S7020, the first belongingness degree calculation unit 6040 calculates a first belongingness degree concerning each anatomical portion as an extraction target. In this case, l represents one portion included in the set L of anatomical portions. In addition, $L'_l$ represents a set obtained by subtracting l from L (that is, $L'_l = L - \{l\}$), and $l'_l$ represents each anatomical portion included in $L'_l$. In this step, the first belongingness degree calculation unit 6040 decides the posterior probability $p_p(l|v)$ of l with respect to each pixel p of the input image and a maximum value $p_p(l'_{l\_max}|v)$ of a posterior probability $p_p(l'_l|v)$ of an anatomical portion $l'_l$ included in $L'_l$. The first belongingness degree calculation unit 6040 calculates a combination of these posterior probabilities ($p_p(l|v)$, $p_p(l'_{l\_max}|v)$) as the first belongingness degree of the pixel p with respect to the anatomical portion l. In this step, the first belongingness degree calculation unit 6040 calculates the first belongingness degrees (combinations of posterior probabilities) of all the pixels of the input image.

First of all, the first belongingness degree calculation unit 6040 obtains the prior distribution of the gray levels in the anatomical portion l (that is, a value $I_{l\_t*\_DB}$ and a variance value $\sigma_{l\_t*\_DB}^2$) from the statistical data obtaining unit 6020 based on the phase information t* estimated in step S7010. The first belongingness degree calculation unit 6040 then calculates the posterior probabilities $p_p(l|v)$ with respect to all the anatomical portions included in L by executing the MAP method executed in step S9040 again. The MAP method in this step, however, uses the average value $I_{l\_t*\_DB}$ and the variance value $\sigma_{l\_t*\_DB}^2$ selected based on the phase information t* as the initial values of distribution information (the average value $l_l$ and the variance value $\sigma_l^2$) of the gray levels given by equation (7). With this processing, the first belongingness degree calculation unit 6040 obtains posterior probabilities $p_p(liver|v)$, $p_p(heart|v)$, . . . , $p_p(others|v)$ with respect to the respective anatomical portions as extraction targets.

Upon calculating posterior probabilities with respect to the respective anatomical portions as extraction targets, the first belongingness degree calculation unit 6040 obtains a maximum value $p_p(l'_{max}|v)$ of the posterior probabilities. This processing is implemented by selecting one of portions of $L'_l$ uniquely determined with respect to the attention portion l which exhibits the maximum posterior probability. Consider, for example, the liver. In this case, when deciding $p_p(\text{liver}'_{max}|v)$, the first belongingness degree calculation unit 6040 selects the maximum posterior probability among posterior probabilities $p_p(\text{heart}_{max}|v)$, $p_p(\text{lkidney}_{max}|v)$, ..., $p_p(\text{others}_{max}|v)$ of portions other than the liver. In general, $p_p(l'_{max}|v)$ concerning the anatomical portion l is calculated by $$p_p(l'_{max}|v) = \max_{l'_l \in L_{l'}} p_p(l'_l|v) \quad (9)$$

Upon calculating $p_p(l'_{max}|v)$ by using equation (9), the first belongingness degree calculation unit 6040 combines it with $p_p(l|v)$ to obtain a combination of values $(p_p(l|v), p_p(l'_{max}|v))$, and sets this as the first belongingness degree of the anatomical portion l. First belongingness degrees $(p_p(\text{liver}|v), p_p(\text{liver}'_{max}|v))$, $(p_p(\text{heart}|v), p_p(\text{heart}'_{max}|v))$, ..., $(p_p(\text{others}|v), p_p(\text{others}'_{max}|v))$ calculated in this step are output to the first region extraction unit 6050.

In this embodiment, a combination of numerical values constituted by the posterior probability of an attention portion and the maximum value among the posterior probabilities of portions other than the attention portion is set as the first belongingness degree. However, the expression of the first belongingness degree is not limited to this. For example, only the posterior probability of the attention portion may be set as the first belongingness degree. Alternatively, a plurality of posterior probabilities, for example, the posterior probability of the first attention portion, the posterior probability of the second attention portion, and the maximum value of the posterior probabilities of other portions, may be obtained as a combination of numerical values and set as the first belongingness degree. In addition, in the embodiment, the maximum value among posterior probabilities is set as one numerical value of the first belongingness degree. However, the average value of posterior probabilities may be used.

(Step S7030: Application of Shape Model to Region Obtained by Using First Belongingness Degree)

In step S7030, the first region extraction unit 6050 extracts a region by using the first belongingness degree, and then applies a shape model to the extracted region. Processing in this step is independently executed for each of anatomical portions as extraction targets. The following will exemplify a case in which a shape energy is calculated with respect to the anatomical portion l.

First of all, the first region extraction unit 6050 obtains shape models stored in the data server 610 via the statistical data obtaining unit 6020. In the following description, of the shape models of the anatomical portion l, an average shape image is represented by $\varphi_{l0}$, and the kth eigenshape image of $N_{shape}$ eigenshape images is represented by $\varphi_{lk}$ ($k=1, \ldots, N_{shape}$).

The first region extraction unit 6050 then extracts the region of the anatomical portion l as an extraction target based on the first belongingness degree calculated in the previous step. The first region extraction unit 6050 obtains this region by applying threshold processing "$p_p(l|v)-p_p(l'_{max}|v)>T_l$" to a first belongingness degree $((p_p(l|v), p_p(l'_{max}|v))$. With this processing, the first region extraction unit 6050 obtains a mask image $M_{ltarget}$ representing the region of the anatomical portion l as an extraction target.

The first region extraction unit 6050 then applies a shape model to the mask image $M_{ltarget}$. With regard to a shape model expressed by a level set distribution model, a mask image representing the shape is obtained by performing threshold processing with a value of 0 with respect to an image $\varphi_l$ expressed by $$\varphi_l = \varphi_{l0} + \Sigma_{k=1}^{Nshape} c_{lk}\varphi_{lk} \quad (10)$$

In this case, $(c_{l1}, c_{l2}, \ldots, c_{lNshape})$ in equation (10) is a parameter of the shape model. Setting various values to this parameter allows the shape model to express various shapes which the anatomical portion l can take. When applying a shape model to the mask image $M_{ltarget}$, the first region extraction unit 6050 performs the following processing. A set of parameters constituted by a plurality of parameters are defined in advance by setting various values to the parameter $(c_{l1}, c_{l2}, \ldots, c_{lNshape})$. The first region extraction unit 6050 then calculates $\varphi_l$ with respect to each parameter included in the set of parameters according to equation (10), and performs threshold processing with a value of 0 with respect to $\varphi_l$. The first region extraction unit 6050 compares a mask image $M_{lshape(cl1, cl2, \ldots, clNshape)}$ with $M_{ltarget}$ to obtain the difference between them. The first region extraction unit 6050 performs this processing with respect to all the parameters defined in advance to obtain a parameter $(c'_{l1}, c'_{l2}, \ldots, c'_{lNshape})$ which minimizes the difference. The first region extraction unit 6050 further substitutes the obtained parameter into equation (10) to obtain a result $M'_{lshape(c'l1, c'l2, \ldots, c'lNshape)}$ of applying the corresponding shape model.

Note that a set of parameters for a shape model can be decided by various methods. The simplest method is to exhaustively assign values within a predetermined range. More specifically, values defined by $c_{li\_min} < c_{li\_max}$ (for i=1, 2, ..., $N_{shape}$) are decided in advance, and a range $[c_{li\_min}, c_{li\_max}]$ of values set by the two numerical values is divided by a constant Z. The resultant value is assigned to $c_{li}$. That is, assignment is performed in the following manner: $c_{li}=k*(c_{li\_max}-c_{li\_min})/Z+c_{li\_min}$ (for k=0, 1, ..., Z). In this case, $c_{li\_min}$ and $c_{li\_max}$ can be set based on eigenvalues obtained when constructing a shape model. For example, letting $\lambda_{lk}$ be an eigenvalue corresponding to an eigenshape image $\varphi_{lk}$, $c_{li\_min}=-Y*\lambda_{lk}$, $c_{li\_max}=Y*\lambda_{lk}$, where Y is a constant decided in advance. In addition, a reciprocal $1/\lambda_{lk}$ or a square root may be used instead of the eigenvalue $\lambda_{lk}$.

(Step S7040: Generation of Graph using First Belongingness Degrees)

In step S7040, the first region extraction unit 6050 generates a graph used for the graph cut method disclosed in U.S. Pat. No. 6,937,212.

A graph in the graph cut method will be described with reference to FIG. 10, limited to items required to understand this embodiment. FIG. 10 explains a graph 1610 by using a two-dimensional image 1600 having three pixels along each side and the corresponding graph 1610 in consideration of the viewability of the drawing.

The graph 1610 generated by the graph cut method is constituted by image nodes one-to-one corresponding to the respective pixels of the image 1600 or each corresponding to a plurality of adjacent pixels in the image. The graph is further constituted by terminals nodes 1612 and 1613 corresponding to foreground and background labels of a region. Pluralities of adjacent image nodes are connected to each other via edges. For example, an image node 1614 corresponding to one pixel 1601 in the image is connected to an image node 1615 corresponding to a pixel 1602 in each of the four vicinities of the pixel 1601 in the image via an edge 1616. The connection vicinity count of a graph is decided in consideration of the balance between the accuracy of region extraction and calculation resources. In general, a connection vicinity count of 4 or 8 is used for two-dimensional images, whereas a connection vicinity count of 6 or 26 is used for three-dimensional images. All the image nodes in the graph are connected to two terminal nodes 1612 and 1613 via edges, in addition to the edges which connect the respective image nodes. For example, the image node 1615 of the graph 1610 is connected to the terminal nodes 1612 and 1613 via edges 1618 and 1619. In the following description, edges stretched between the image nodes are written as p-links, and two edges stretched between each node and the terminal nodes are written as n-links.

All the n-links and t-links have positive numbers called energies. In general, an energy is assigned to an n-link based on the similarity between pixels (or regions) corresponding to two image nodes. Energies are assigned to t-links based on the likelihoods of the corresponding pixel being the foreground and the background.

Referring back to the description of step S7040 in FIG. 7, the first region extraction unit 6050 generates, in this step, a graph used in the graph cut method, based on the first belongingness degree ($(p_p(l|v), p_p(l'_{max}|v))$) calculated in step S7020 and the shape model application result obtained in step S7030. Note that one graph is generated for each anatomical portion as an extraction target. The following will exemplify a case in which a graph $G_l$ corresponding to the anatomical portion l is generated.

First of all, the first region extraction unit 6050 generates image nodes corresponding to the respective pixels of an input image. The image nodes and the terminal modes are connected via the t-links, and the image nodes are connected to each other via the n-links.

The first region extraction unit 6050 then sets energy values for all the t-links in the graph $G_l$ based on the first belongingness degree ($(p_p(l|v), p_p(l'_{max}|v))$) calculated in step S7020. Let $N_p$ be an image node corresponding to a pixel p. Letting $E_{sp}$ and $E_{pt}$ be energies assigned to the t-links which connect the image node $N_p$ to the two terminal nodes, then $E_{sp}$ and $E_{pt}$ are set as follows:

$$\left.\begin{array}{l} E_{sp} = p_p(l|v) \\ E_{pt} = p_p(l'_{max}|v) \end{array}\right\} \quad (11)$$

Energies are assigned to all the t-links in the graph $G_l$ according to equations (11).

Finally, energies are set for all the p-links in the graph. The energies to be assigned to the n-links are calculated according to a known method. Let $N_A$ be an image node corresponding to a pixel A in the input image, and $N_B$ be an image node corresponding to a neighbor pixel B of the pixel A. Let $I_A$ be the pixel value of the pixel A, and $I_B$ be the pixel value of the pixel B. In addition, let dist(A, B) be a function for returning the distance between the pixel A and the pixel B on the image. Furthermore, S(A, B) be a function which refers to a shape model application result (to be described in detail later). An energy $E_{N_AN_B}$ to be assigned to the n-link which connects the image nodes $N_A$ and $N_B$ to each other is calculated by $$E_{N_AN_B} = W_{int\ ensity} \times \exp\left(-\frac{(I_A - I_B)^2}{2\sigma^2}\right) \cdot \frac{1}{dist(A, B)} + W_{mod\ el} \times S(A, B) \quad (12)$$

In equation (12), $W_{intensity}$ and $W_{model}$ are respectively weight coefficients for deciding the contributions of the first term (the term associated with an image gray level) and the second term (the term associated with a shape model application result). In addition, σ is a constant for evaluating the proximity between the pixel values $I_A$ and $I_B$. Note that this constant is a numerical value of a type different from a gray level distribution information $\sigma_l^2$ or the like described above in step S9040.

The second term of equation (12) is an energy term of returning a value upon referring to a shape model application result. This term is introduced to make the boundary of the region obtained in this step have a shape similar to that of the boundary of the region of an anatomical portion in the mask image $M'_{lshape(c'l1,\ c'l2,\ \ldots,\ c'lNshape)}$ obtained in the previous step. A term having such an effect can be expressed in various forms. This embodiment uses the following term.

$$S(A, B) = 1 - \exp\left(\frac{-1 \times |\phi_l(A) + \phi_l(B)|}{2\omega}\right) \quad (13)$$

In equation (13), $\varphi_l$ is a distance image obtained by applying a signed distance transformation to $M'_{lshape(c'l1,\ c'l2,\ \ldots,\ c'lNshape)}$, and ω is a positive constant. In this case, the signed distance transformation gives a positive distance value to each pixel, of the pixels in $M'_{lshape(c'l1,\ c'l2,\ \ldots,\ c'lNshape)}$, which belongs to the region of the anatomical portion, and gives a negative value to each pixel which does not belong to the region. Energies are assigned to all the n-links in the graph $G_l$ according to equations (12) and (13) described above.

The first region extraction unit 6050 generates a graph corresponding to each anatomical portion as an extraction target by the above method.

(Step S7050: Region Extraction by Graph Cut Method)

In step S7050, the first region extraction unit 6050 extracts the regions of all the anatomical portions as extraction targets from the input image. In this step, the first region extraction unit 6050 performs region extraction by using the graph cut method disclosed in U.S. Pat. No. 6,937,212. More specifically, the first region extraction unit 6050 cuts the graph $G_l$ generated in step S7040 into two partial graphs by using the Max-flow/min-cut algorithm, and specifies the region of the anatomical portion l based on the cutting result. The first region extraction unit 6050 performs this processing for all the anatomical portions to obtain the regions of all the anatomical portions.

Upon completion of the processing in step S7050, the first region extraction unit 6050 outputs the extraction results of all the regions in the form of three-dimensional label images to the data server 610 to save them in it.

(Step S7060: Display of Region Extraction Results)

In step S7060, the display control unit 6060 displays the region of each portion obtained by region extraction in step S7050 on the input image. In this embodiment, a slice of the label image obtained in step S7040 is superimposed and displayed on a tomographic image of the input image which is designated by the user via a UI (User Interface) (not shown).

As has been described so far, according to this embodiment, it is possible to extract attention regions existing in medical images in various phases with higher accuracy than simple region extraction methods such as a region expansion method and a dynamic contour method.

(Modification 3-1)

The above embodiment is configured to estimate a phase as one of the states, namely, "non-contrast enhancement", "early phase", "portal phase", and "late phase", and select a prior distribution necessary for the calculation of a first belongingness degree based on the estimation result. However, phases may be classified into other categories concerning temporal changes in gray level in an image as long as the categories allow the selection of prior distributions. For example, a plurality of phases exhibiting similar distributions of gray levels may be integrated. For example, "early phase" and "late phase" may be integrated to estimate that a given phase belongs to one of "non-contrast enhancement", "portal phase", or "early phase or late phase". In addition, a state to be estimated need not always match a "phase" classified in the medical field, and may be properly defined based on variations in prior distribution.

In addition, a state to be estimated may be a continuous state such as an elapsed time since contrast material administration instead of a discrete state such as a "phase". In this case, the data server 610 holds in advance, as statistical data, a function (prior distribution function) of receiving an elapsed time since contrast material administration as an argument and returning the gray level distribution of the anatomical portion as an extraction target at that time. In addition, the data server 610 holds in advance a function (elapsed time function) of receiving a feature amount for phase estimation as an argument and estimating an elapsed time since contrast material administration.

In this case, a prior distribution function and an elapsed time function are obtained from images of a plurality of cases which are captured in advance. More specifically, first of all, elapsed times from contrast material administration, the distribution information (the average value and variance value) of the gray levels in each anatomical portion as an extraction target, and feature amounts for phase estimation are obtained from the respective images. A prior distribution function is then obtained by applying a function with an elapsed time being an explanatory variable and the distribution information of gray levels being an objective variable to the elapsed time since contrast material administration and each distribution information of gray levels. In addition, an elapsed time function is obtained by applying a function with a feature amount for phase estimation being an explanatory variable and an elapsed time being an objective variable to each combination of the elapsed time since contrast material administration and a feature amount for phase estimation.

Processing in this modification will be described. In step S9060, the phase information obtaining unit 6030 performs the following processing instead of phase estimation. That is, the phase information obtaining unit 6030 calculates a feature amount for phase estimation and then estimates an elapsed time from the feature amount for phase estimation by using the above elapsed time function. In step S7020, the first belongingness degree calculation unit 6040 estimates the prior distribution of the gray levels in a region corresponding to each anatomical portion as an extraction target by using the estimated elapsed time and the prior distribution function.

As has been described above, the image processing apparatus according to this modification estimates information in place of phase information (that is, "non-contrast enhancement", "early phase", "portal phase", or "late phase"). Using such a method can extract attention regions existing in medical images in various phases with higher accuracy than simple region extraction methods such as a region expansion method and a dynamic contour method.

(Modification 3-2)

The third embodiment is configured to estimate a phase as one of the states, namely, "non-contrast enhancement", "early phase", "portal phase", and "late phase", and select a prior distribution necessary for the calculation of a first belongingness degree based on the estimation result. However, it is possible to use information concerning a temporal change in gray level in an image other than a phase as long as it is possible to select a prior distribution necessary for the calculation of a first belongingness degree.

This modification uses the feature amount for phase estimation which is calculated in step S9050 as a feature representing a temporal change in gray level in an image. The prior distribution of the gray levels in an anatomical portion is then estimated directly from this feature amount (that is, without intermediacy of any phase ("non-contrast enhancement", "early phase", "portal phase", or "late phase") information) by using the statistical data obtained by the statistical data obtaining unit 6020.

Statistical data in this modification includes a function which associates the prior distribution (the average value and variance value) of the gray levels in each anatomical portion as an extraction target with a feature amount for phase estimation. This function has the role of a correspondence table which receives a feature amount for phase estimation as an argument and then returns the prior distribution of the gray levels in each anatomical portion as an extraction target. Like a probabilistic atlas, this function is generated by the image data of each of many cases captured in advance and manually generated label images representing anatomical portions. First of all, the distribution information (the average value and variance value) of the gray levels in each anatomical portion is calculated by using image data and a label image. A feature amount space is then defined, with the feature amounts of gray levels in the liver and the heart as anatomical portions for phase estimation being assigned to axes. Finally, this function is generated by applying a function with the distribution information of the gray levels in each anatomical portion as an extraction target being an objective variable and a feature amount for phase estimation being an explanatory variable.

Processing in this modification will be described. In step S7010, the phase information obtaining unit 6030 performs the processing in steps S9010 to S9050. In step S7020, the first belongingness degree calculation unit 6040 estimates the prior distribution of the gray levels in each anatomical portion as an extraction target by using the feature amount for phase estimation calculated in step S9050. More specifically, the first belongingness degree calculation unit 6040 obtains the values of a prior distribution by inputting the feature amount for phase estimation to the gray level function which returns the prior distribution of each anatomical portion. The first belongingness degree calculation unit 6040 then calculates a first belongingness degree by using the estimated prior distribution of gray levels.

As has been described so far, the image processing apparatus according to this modification can obtain a more precise state than phase information (that is, "non-contrast enhancement", "early phase", "portal phase", "late phase", or the like) by using a feature amount space. It is therefore possible to extract attention regions existing in medical images in various phases with higher accuracy than simple region extraction methods such as a region expansion method and a dynamic contour method.

(Modification 3-3)

In the processing in step S7020 according to the above embodiment, an average value and a variance value are obtained as the prior distribution of gray levels set for each phase. However, it is not always necessary to obtain both an average value and a variance value in accordance with a phase. For example, only an average value may be obtained in accordance with a phase while a common fixed value is used as a variance value.

(Modification 3-4)

In step S7010 according to the above embodiment, the phase information obtaining unit 6030 calculates a feature amount for phase estimation from an input image and obtains phase information by using the calculation result. If, however, phase information is added to an input image, the phase information obtaining unit 6030 may use the added information. If, for example, an input image is saved in the DICOM format and its header portion (DICOM header) stores the image capturing time and phase information ("non-contrast enhancement", "early phase", "portal phase", "late phase", or the like), the phase information obtaining unit 6030 may obtain these pieces of information. Even if an input image is not saved in the DICOM format, when the image capturing time corresponding to the input image or phase information is stored in the data server 610 in some format, the phase information obtaining unit 6030 may obtain these pieces of information.

Fourth Embodiment

The third embodiment is configured to estimate the phase information of an input image and calculate a first belongingness degree based on the estimated phase information. A region corresponding to an anatomical portion as an extraction target is then extracted from the input image based on the calculated first belongingness degree. An image processing apparatus according to the fourth embodiment also extracts a region corresponding to an anatomical portion as an extraction target by the same method as that used in the third embodiment. In the fourth embodiment, however, upon extracting a region in the same manner as in the third embodiment, the image processing apparatus calculates a belongingness degree (second belongingness degree) different from that used in the third embodiment by referring to the extracted region. The apparatus then extracts a region corresponding to an anatomical portion as an extraction target again based on the second belongingness degree. With this processing, the image processing apparatus extracts the region of the anatomical portion with higher accuracy than the image processing apparatus according to the third embodiment. The image processing apparatus according to the fourth embodiment will be described below with reference to FIGS. 11 to 13, mainly on differences from the third embodiment.

Figure 11:
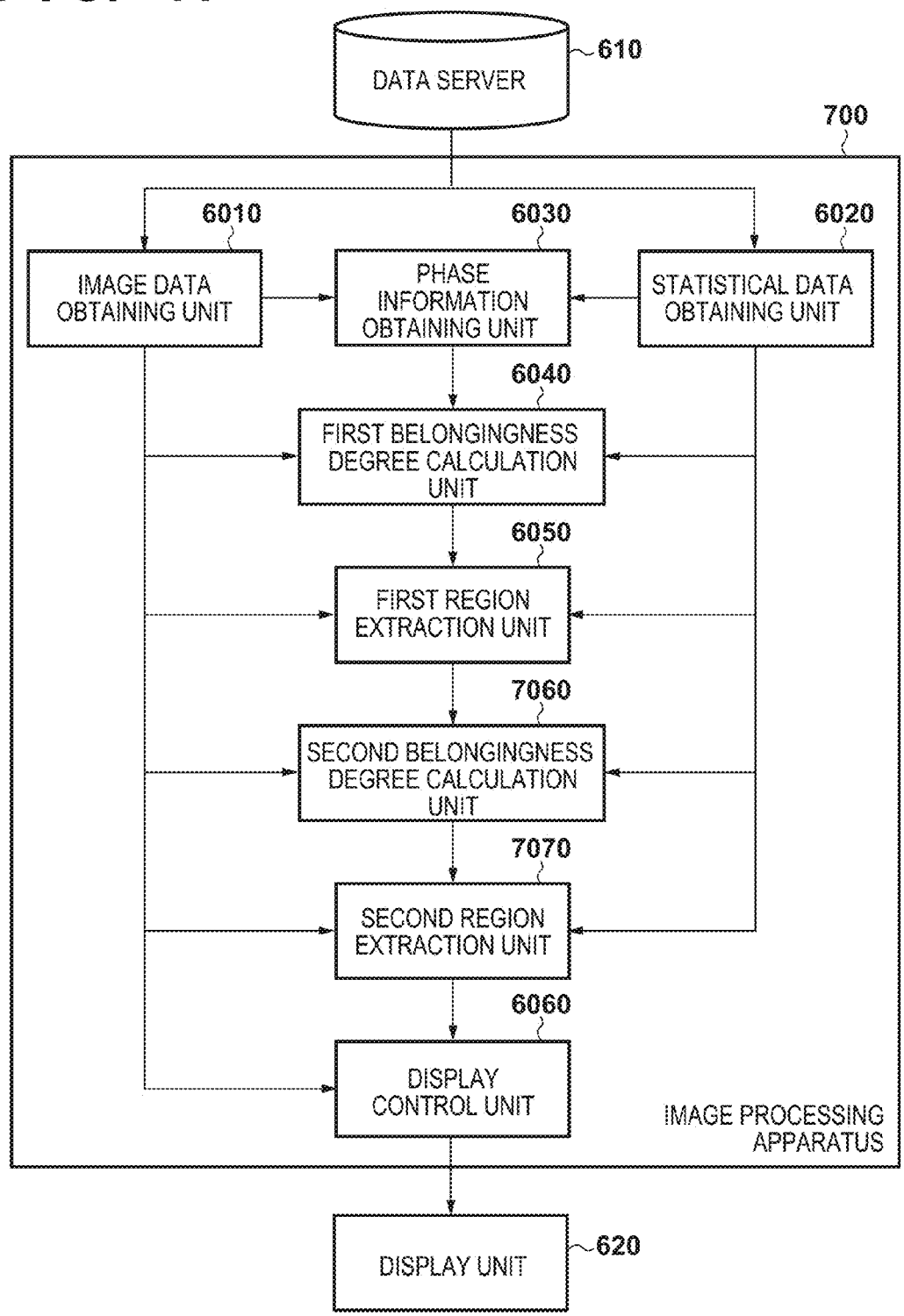
FIG. 11 is a block diagram showing an example of the arrangement of an image processing apparatus according to the fourth embodiment.

FIG. 11 shows an example of the arrangement of an image processing system according to this embodiment. The same reference numerals as in the third embodiment denote the same components. As is obvious from FIG. 11, an image processing apparatus 700 according to this embodiment includes a second belongingness degree calculation unit 7060 and a second region extraction unit 7070 in addition to the constituent elements of the image processing apparatus 600 according to the third embodiment. In this case, an image data obtaining unit 6010, a statistical data obtaining unit 6020, a phase information obtaining unit 6030, a first belongingness degree calculation unit 6040, a first region extraction unit 6050, a display control unit 6060, a data server 610, and a display unit 620 each perform the same processing as that in the image processing apparatus 600 according to the third embodiment. For this reason, a description of the processing will be omitted.

The first region extraction unit 6050 executes the same processing as that executed by the first region extraction unit in the image processing apparatus 600 according to the third embodiment. However, upon extracting a region corresponding to an anatomical portion as an extraction target from an input image, the first region extraction unit 6050 outputs the extraction result to a second belongingness degree calculation unit 7060 instead of the display control unit 6060.

The second belongingness degree calculation unit 7060 calculates a belongingness degree (second belongingness degree) different from the belongingness degree calculated by the first belongingness degree calculation unit 6040 by referring to the region extracted by the first region extraction unit 6050. The calculated belongingness degree is output to a second region extraction unit 7070.

The second region extraction unit 7070 extracts a region corresponding to an anatomical portion as an extraction target again from the input image based on the belongingness degree calculated by the second belongingness degree calculation unit 7060. This processing unit, unlike the first region extraction unit 6050, iteratively executes region extraction processing. The information of the extracted region is output to the display control unit 6060.

<Processing by Image Processing Apparatus>

Figure 12:
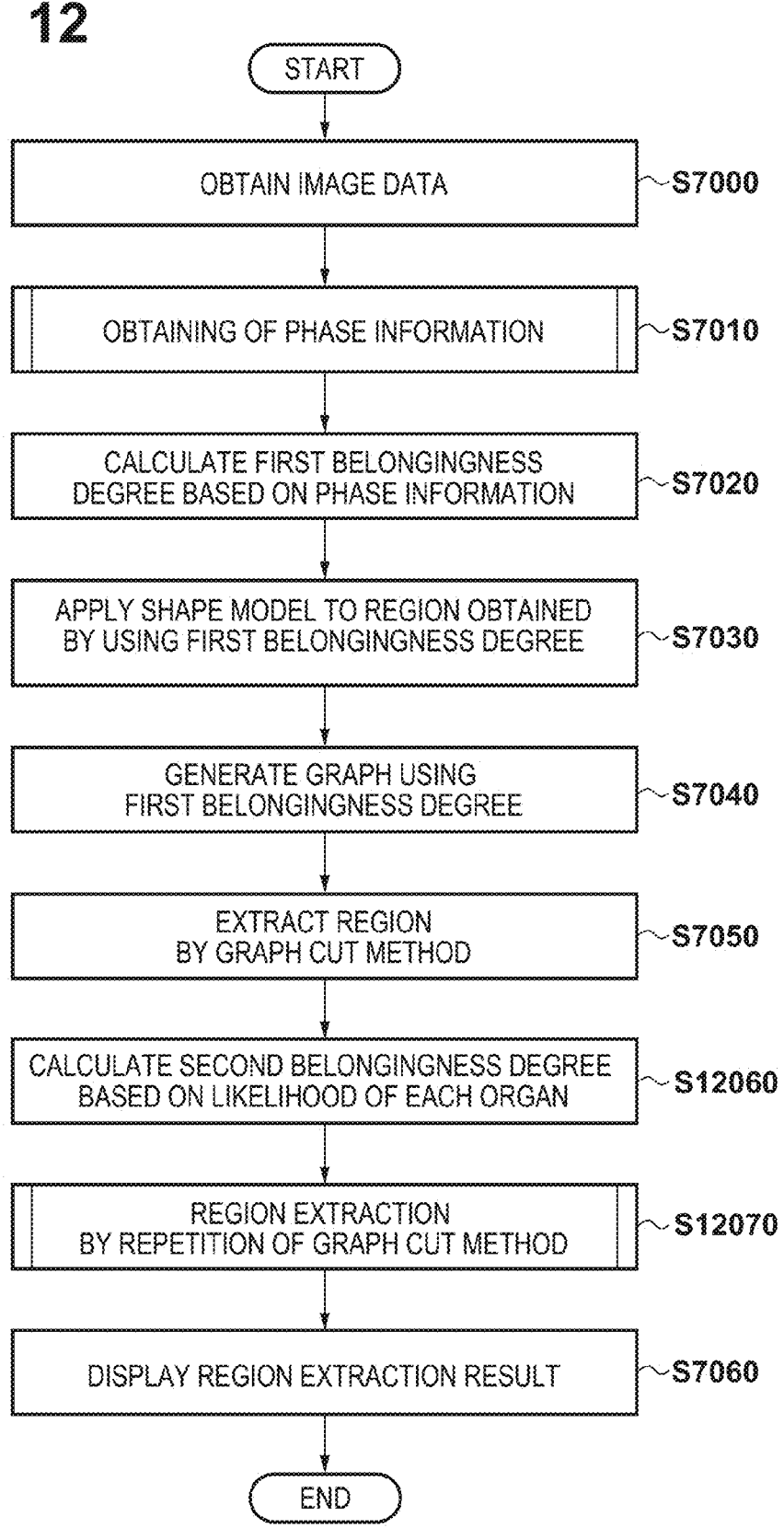
FIG. 12 is a flowchart showing an overall processing procedure executed by the image processing apparatus according to the fourth embodiment.

FIG. 12 is a flowchart showing an overall processing procedure executed by the image processing apparatus 700 according to this embodiment. Processing executed by each processing unit in steps S7000 to S7060 is the same as that in the third embodiment, and hence a description of the processing will be omitted.

(Step S12060: Calculation of Belongingness Degree (Second Belongingness Degree) with Respect to Each Organ)

In step S12060, the second belongingness degree calculation unit 7060 calculates a second belongingness degree concerning each anatomical portion as an extraction target. The second belongingness degree calculation unit 7060 calculates a second belongingness degree based on a likelihood obtained by using the MAP method. Like a first belongingness degree, a second belongingness degree is calculated concerning each pixel of an input image. That is, the second belongingness degree calculation unit 7060 calculates, for each pixel p of an input image, a combination $(p_p(v|l), p_p(v|others))$ of a likelihood $p_p(v|l)$ of an anatomical portion l and a likelihood $p_p(v|others)$ of "the other anatomical portion" as a second belongingness degree with respect to the anatomical portion l. In this step, the second belongingness degree calculation unit 7060 calculates such second belongingness degrees (likelihood combinations) concerning all the pixels of the input image.

The likelihood $p_p(v|l)$ of each anatomical portion l as an extraction target can be calculated by iteratively executing the MAP method executed in step S9040. When executing the MAP method, the second belongingness degree calculation unit 7060 requires distribution information (an average value $l_l$ and a variance value $\sigma_l^2$) of gray levels represented by equation (7) as an initial value. In this step, this initial value is calculated from the region of the anatomical portion obtained in step S7050. That is, the second belongingness degree calculation unit 7060 calculates an average value and a variance value by referring to the pixel values of the pixels in the region extracted as the portion l in the input image. The second belongingness degree calculation unit 7060 obtains the likelihood $p_p(v|l)$ concerning each portion included in L by executing the MAP method using such values obtained in this manner as initial values. Finally, the second belongingness degree calculation unit 7060 generates the combination $(p_p(v|l), p_p(v|others))$ concerning the anatomical portion l and sets it as the second belongingness degree of the anatomical portion l.

In this embodiment, one combination of numerical values constituted by the likelihood of an attention portion and the likelihood of "the other anatomical portion" is set as a second belongingness degree. However, the expression of the second belongingness degree is not limited to this. For example, only the likelihood of the attention portion may be set as the second belongingness degree. Alternatively, a plurality of likelihoods, for example, the likelihood of the first attention portion, the likelihood of the second attention portion, and the likelihood of "the other anatomical portion" may be obtained as a combination of likelihoods and set as the second belongingness degree. In addition, like the first belongingness degree in the third embodiment, the maximum value or average value of a plurality of likelihoods may be used.

Note that as the initial value of the distribution information of gray levels (the initial values of the average and variance values represented by equation (7)) in this step, the distribution information of gray levels obtained in step S7020, that is, the average value and the variance value estimated by the EM algorithm, may be used.

(Step S12070: Region Extraction by Repetition of Graph Cut Method)

In step S12070, the second region extraction unit 7070 extracts a region corresponding to an anatomical portion as an extraction target. Processing in this step will be described in detail below with reference to the flowchart shown in FIG. 13.

(Step S13010: Correction of Extracted Region)

Figure 13:
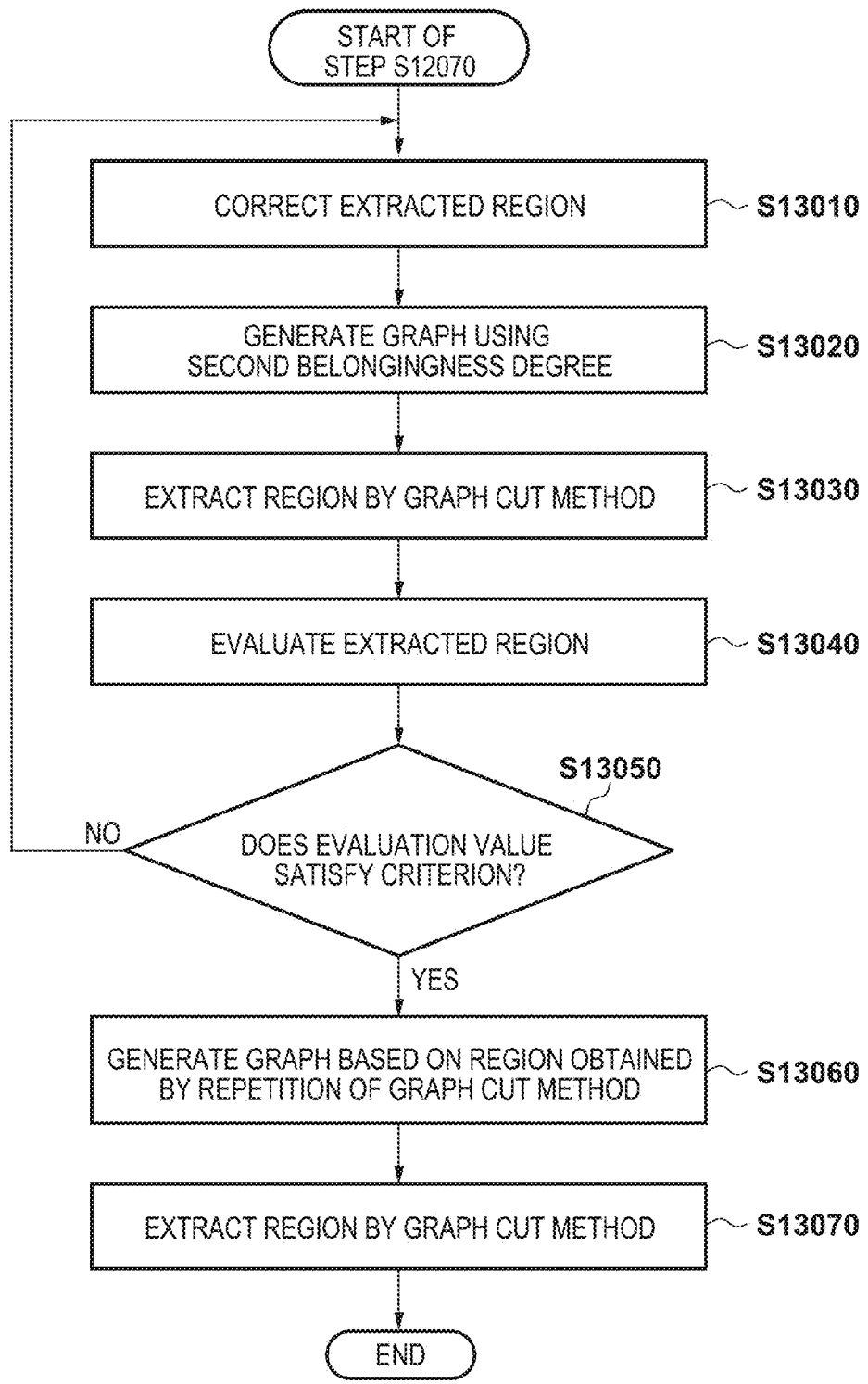
FIG. 13 is a flowchart showing a processing procedure executed by a second region extraction unit according to the fourth embodiment.

As is obvious from FIG. 13, in step S12070, the second region extraction unit 7070 extracts a region corresponding to an anatomical portion as an extraction target by iteratively executing processing in steps S13010, S13020, S13030, S13040, and S13050. The nth extraction processing will be described below. A case in which the region of the anatomical portion l extracted by the previous extraction processing is stored in a mask image $M^{[n]}_l$ will also be described below. In this case, $M^{[n]}_l$ represents a binary image, and its pixel value $M^{[n]}_l(p)$ differs depending on whether the pixel p belongs to the portion l. If, for example, the pixel p belongs to the region of the portion l, $M^{[n]}_l(p)=1$ (or a certain constant other than 0); otherwise, $M^{[n]}_l(p)=0$. Note that as $M^{[0]}_l$, that is, the mask image at the start of iterative processing, a mask image of the region of the anatomical portion l extracted in step S7050 in FIG. 12 is used.

Iterative processing in steps S13010, S13020, S13030, S13040, and S13050 sometimes takes much calculation time. In order to reduce this calculation time, it is possible to execute the processing upon reducing the size of an input to the iterative processing, more specifically, the size of an input image or an image size such as a second belongingness degree calculated in the previous step, before the execution of the iterative processing. Such a reduction in image size (image reduction) can be executed by a sampling method which is known image processing, such as a nearest neighbor interpolation method, linear interpolation method, or cubic interpolation method.

In step S13010, the second region extraction unit 7070 corrects a previous extraction result concerning the region of an anatomical portion. In this step, the second region extraction unit 7070 executes various types of processing in accordance with an anatomical portion to be extracted. This embodiment will exemplify the liver as one of the anatomical portions as extraction targets.

The liver sometimes has an anatomically abnormal region such as a tumor or necromantic region. Such an abnormal region often exists as a bright (or dark) spherical region in the liver region in an input image. If such an abnormal region exists in a peripheral portion of the liver, the graph cut method sometimes cannot extract such an abnormal region. For this reason, in this step, such an abnormal region is extracted and added to a region extracted by the graph cut method.

This processing is executed in combination with a known image processing method. First of all, drawing enlargement/reduction (dilation/erosion processing as morphological operation) is applied to a mask image $M^{[n-1]}_{liver}$ storing a prevision extraction result on the liver. This makes it possible to obtain a new mask image additionally having a bright (or dark) spherical region in a peripheral portion of the liver, which has not been possible to extract by the previous extraction processing. This mask image is written as $M^{[n]}_{tmp}$.

Subsequently, the second region extraction unit 7070 performs subtraction between the images $M^{[n]}_{tmp}$ and $M^{[n-1]}_{liver}$ to extract only the bright (or dark) spherical region existing in the peripheral portion of the region. More specifically, when extracting a bright spherical region, the second region extraction unit 7070 newly sets a pixel value $M^{[n]}_{tmp}(p)$ of each pixel p which satisfies $M^{[n]}_{tmp}(p)=1$ and $M^{[n-1]}_{liver}=0$ and $I(p)>T_{tmp}$ to $M^{[n]}_{tmp}(p)=1$. In contrast to this, the second region extraction unit 7070 sets the pixel value of each pixel which does not satisfy this condition to $M^{[n]}_{tmp}(p)=0$. When extracting a dark spherical region, the second region extraction unit 7070 performs similar threshold processing under the condition of $I(p)<T_{tmp}$ instead of $I(p)>T_{tmp}$. Applying labeling processing to $M^{[n]}_{tmp}$ obtained in this manner will obtain each region in $M^{[n]}_{tmp}$.

Finally, the second region extraction unit 7070 performs determination processing concerning the validity of each region in $M^{[n]}_{tmp}$. A region to be currently extracted is a spherical region. The second region extraction unit 7070 therefore calculates the sphericity of each region in $M^{[n]}_{tmp}$, and deletes each region whose sphericity is smaller than a threshold $T_{sphericity}$ from $M^{[n]}_{tmp}$. A known image processing method may be used as a method of calculating sphericity. In addition, in this embodiment, the number of pixels in each region may be added as one of selection conditions. That is, the second region extraction unit 7070 counts the number of pixels connected to form a given region, and deletes the region whose count is smaller than a threshold $T_{volume}$. This makes it possible to delete each region (each small region in particular) determined as a sphere based on the sphericity from $M^{[n]}_{tmp}$.

The mask image $M^{[n]}_{tmp}$ obtained by the above processing is integrated with the previous extraction result $M^{[n-1]}_{liver}$.

Note that this step can be selectively executed. That is, if it is known in advance that no abnormal region exists in an input image, the execution of this step can be omitted. In addition, even if this step is executed after the execution of step S13030, the same effect as that described above can be obtained.

In this step, proper processing may be executed in accordance with an anatomical portion as an extraction target. In addition, processing in the step may be changed in accordance with a phase. For example, when extracting the heart, right kidney, left kidney, or spleen, it is possible to selectively extract an especially bright region by using an image processing method.

(Step S13020: Generation of Graph Using Second Belongingness Degree)

In step S13020, the second region extraction unit 7070 generates a graph to be used for the graph cut method based on the second belongingness degree calculated in step S12060. Note that one graph is generated for each anatomical portion as an extraction target. An example of generating a graph $G^{[n]}_l$ corresponding to the anatomical portion l will be described below.

A graph is generated by the same processing as that in step S7040. The generation of a graph in this step differs from that in step S7040 in a method of calculating link energies assigned to t-links and p-links.

A method of calculating energies assigned to t-links will be described. Let $N_p$ be an image node corresponding to a pixel p, and $E_{sp}$ and $E_{pt}$ respectively be energies assigned to t-links connecting the image node $N_p$ to two terminal nodes $N_s$ and $N_t$. Then, $E_{sp}$ and $E_{pt}$ are calculated based on the second belongingness degree $(p_p(v|l), p_p(v|others))$ calculated in the previous step and a pixel value (distance value) $D^{[n]}_l(p)$ of a distance image $D^{[n]}_l$ generated from the mask image $M^{[n-1]}_l$. The details of this calculation will be described.

First of all, the distance value $D^{[n]}_l(p)$ is obtained. The distance value $D^{[n]}_l(p)$ is obtained by applying signed distance transformation, which is a known image processing method, to the mask image $M^{[n-1]}_l$. The signed distance transformation used in this case gives a positive distance value to each pixel, of the pixels in $M^{[n]}_l$, which is included in the region of the portion l and gives a negative distance value to each pixel which is not included in the region.

Subsequently, a value $B^{[n]}_l(p)$ is calculated, which is referred to calculate $E_{sp}$ and $E_{pt}$ from second belongingness degree $(p_p(v|l), p_p(v|others))$ and the distance value $D^{[n]}_l(p)$. The value $B^{[n]}_l(p)$ is calculated by $$B_l^{[n]}(p) = W_{likelihood} \times (p_p(v|l) - p_p(v|others)) + W_{distance} \times (D_l^{[n]}(p) + D_{const}) \quad (14)$$

where $D_{const}$ is a number representing a distance value. Making this value a positive value makes it possible to expect that the region of the anatomical portion extracted in this step will become larger than the region obtained in the previous step. In contrast to this, making this value a negative value makes it possible to expect that the region obtained in this step will become smaller than the region obtained in the previous step. In this embodiment, $D_{const}$ is a positive number.

$W_{likelihood}$ and $W_{distance}$ in equation (14) are respectively weight constants to be multiplied by the term associated with a second belongingness degree and the term associated with a distance value. These values are experimentally decided.

Finally, $E_{sp}$ and $E_{pt}$ are calculated based on $B^{[n]}_l(p)$ calculated by equation (14). Different formulas are used for calculating the values of $E_{sp}$ and $E_{pt}$ depending on the sign of $B^{[n]}_l(p)$. If $B^{[n]}_l(p)$ is a positive number, $E_{sp}$ and $E_{pt}$ are calculated by the following equations:

$$\left. \begin{array}{l} E_{sp} = B_l^{[n]}(p) \\ E_{pt} = 0 \end{array} \right\} \quad (15)$$

In contrast, if $B^{[n]}_l(p)$ is a negative number, the values of $E_{sp}$ and $E_{pt}$ are calculated based on the following equations:

$$\left. \begin{array}{l} E_{sp} = 0 \\ E_{pt} = -B_l^{[n]}(p) \end{array} \right\} \quad (16)$$

Energies are assigned to all the t-links in the graph $G^{[n]}_l$ according to equations (15) or (16).

A method of calculating energies to be assigned to the n-links will be described next. As in step S7040, in this step, energies to be assigned to the n-links are calculated by using equations (12) and (13). The calculation in this step differs from that in step S7040 in a method of calculating $\theta_l$ in equation (13). In this step, $\theta_l$ is set to the distance image $D^{[n]}_l$ obtained when energies are calculated for the t-links. That is, $\theta_l = D^{[n]}_l$. Energies are assigned to all the n-links in the graph $G^{[n]}_l$ by using such a calculation method.

The graph $G^{[n]}_l$ corresponding to each anatomical portion as an extraction target is generated by the above method.

(Step S13030: Region Extraction by Graph Cut Method)

In step S13030, the second region extraction unit 7070 applies the graph cut method to the graph $G^{[n]}_l$ calculated in the previous step to extract a region corresponding to an anatomical portion as an extraction target from the input image. The processing in this step is the same as that in step S7050.

(Step S13040: Evaluation of Extracted Region)

In step S13040, the second region extraction unit 7070 evaluates the region extracted in the previous step based on predetermined criteria. The evaluation results are used to determine the end of the iterative processing in the next step.

In this step, an extracted region is evaluated based on three criteria. The following will describe criteria for evaluation in the step by using a label image storing the regions of all the portions obtained by the nth region extraction processing. In this label image, when the pixel p belongs to the region of the portion l, a corresponding pixel value $R_p^{[n]}$ becomes 1. That is, $R_p^{[n]} = 1$.

The first criterion for evaluation in this step is the difference between the region of the portion l obtained by the previous region extraction and the region obtained by the current region extraction. More specifically, the criterion is the number of pixels in the portion l which satisfy $R_p^{[n-1]} = 1$ and $R_p^{[n-1]} ! = 1$ or $R_p^{[n-1]} ! = 1$ and $R_p^{[n-1]} = 1$. Note that "a!=b" represents that the two numerical values a and b are different from each other.

The second criterion is a portion, of regions each of which is not extracted as the region of the portion l by the previous region extraction, which is extracted as the region of the portion l by the current region extraction. More specifically, the second criterion is the number of pixels in the portion l which satisfy $R_p^{[n-1]} ! = 1$ and $R_p^{[n-1]} = 1$.

In contrast to the second criterion, the third criterion is a portion, of portions each of which is extracted as the region of the portion l by the previous region extraction, which is not extracted as the region of the portion l by the current region extraction. More specifically, the third criterion is the number of pixels in the portion l which satisfy $R_p^{[n-1]} = 1$ and $R_p^{[n-1]} ! = 1$.

The region of each portion included in the set L of anatomical portions is evaluated by the above three criteria. Evaluation results on the portion l obtained by the nth region extraction processing are expressed by $V_{l\_1}$, $V_{l\_2}^{[n]}$, and $V_{l\_3}^{[n]}$.

(Step S13050: Determination of Evaluation Values and Control of Procedure)

In step S13050, the second region extraction unit 7070 determines the end of iterative region extraction processing based on the evaluation results obtained in the previous step. In this step, the evaluation results are determined by the following two conditions: condition 1: $V_{l\_1}^{[n-1]}=0$ and condition 2: $V_{l\_2}^{[n-1]}=V_{l\_2}^{[n]}$ and $V_{l\_3}^{[n-1]}=V_{l\_3}^{[n]}$. The second region extraction unit 7070 determines whether at least one of the two conditions is satisfied. If at least one condition is satisfied, the second region extraction unit 7070 executes processing in step S13060. If neither of them is satisfied, the process returns to step S13010.

(Step S13060: Generation of Graph Based on Region Obtained by Repetition of Graph Cut Method)

In this and next steps, the second region extraction unit 7070 extracts a region corresponding to an anatomical portion as an extraction target again from the input image. The second region extraction unit 7070 executes steps S13060 and S13070 to further improve the accuracy of the region extracted by the iterative processing in steps S13010, S13020, S13030, S13040, and S13050. For this purpose, it is preferable to execute these two steps with the same image size as that of the input image or at least an image size larger than the image size used in the iterative processing. If the image size has been reduced in the iterative processing, it is preferable to execute these steps upon performing the processing of transforming the image size of an output obtained by the iterative processing, for example, a mask image as an extraction result on an anatomical portion, into an image size equal to that of the input image. Such image size transformation can be executed by a sampling method which is known image processing, such as a nearest neighbor interpolation method, linear interpolation method, or cubic interpolation method.

In step S13060, the second region extraction unit 7070 generates a graph used for the graph cut method based on the region of the anatomical portion extracted by the iterative processing in steps S13010 to S13050. The following will describe a case in which the iterative calculation in steps S13010 to S13050 is finished at the mth time. Note that one graph is generated for each anatomical portion as an extraction target as in the above case. The following will describe a case in which the second region extraction unit 7070 generates a graph $G^{[m]}_l$ corresponding to the anatomical portion l. In addition, assume that a region corresponding to the anatomical portion l is stored in a mask image $M^{[m]}_l$.

The graph $G^{[m]}_l$ is generated by the same processing as that in step S13020. The generation of the graph in this step differs from that in step S13010 in a method of calculating energies to be assigned to t-links. In step S13020, the value $B^{[m]}_l(p)$ which is referred to calculate $E_{sp}$ and $E_{pt}$ is calculated according to equation (13). In this step, as indicated by the following equation, this value is calculated based on a distance value $D^{[m]}_l(p)$ of a distance image $D^{[m]}_l$ obtained by performing signed distance transformation of the mask image $M^{[m]}_l$. The signed distance transformation used in this case gives a positive distance value to each pixel, of the pixels in $M^{[m]}_l$, which is included in the region of the portion l and gives a negative distance value to each pixel which is not included in the region.

$$B_l^{[m]}(p)=w'_{distance} \times D_l^{[m]}(p) \quad (17)$$

where $w'_{distance}$ is a weight constant multiplied by the term associated with a distance value. This value is experimentally decided.

Finally, the second region extraction unit 7070 calculates $E_{sp}$ and $E_{pt}$ based on $B^{[m]}_l(p)$ calculated by equation (17). Calculation formulas to be used are similar to equations (15) and (16) used in step S13020. That is, when $B^{[m]}_l(p)$ is a positive number, equations (15) are used. In contrast to this, when $B^{[m]}_l(p)$ is a negative number, equations (16) are used. Note however that in either case, $B^{[m]}_l(p)$ is used instead of $B^{[n]}_l(p)$. Performing this calculation will assign energies to all the t-links in the graph $G^{[m]}_l$.

The second region extraction unit 7070 generates the graph $G^{[m]}_l$ corresponding to each anatomical portion as an extraction target by the above method.

(S13070: Graph Cut Method)

In step S13070, the second region extraction unit 7070 extracts a region corresponding to an anatomical portion as an extraction target from the input image by applying the graph cut method to each graph $G^{[m]}_l$ calculated in the previous step. The processing in this step is the same as that in step S7050.

This is the end of the detailed description of processing executed by the second region extraction unit 7070 in step S12070.

Upon completing the processing in step S12070, the second region extraction unit 7070 outputs the information of the extracted region to the display control unit 6060. The display control unit 6060 then executes the processing in step S7060. This processing is the same as that performed by the image processing apparatus 600 according to the third embodiment.

As has been described so far, according to this embodiment, it is possible to extract anatomical portions existing in medical images in various phases with higher accuracy than the third embodiment.

As has been described above, according to the third and fourth embodiments, it is possible to extract attention regions existing in medical images in various phases with high accuracy. In addition, it is possible to extract anatomical portions existing in medical images in various phases with higher accuracy than simple region extraction methods such as a region expansion method and a dynamic contour method.

According to the present invention, it is possible to improve the accuracy of subsequent image processing even with a deficit or error in phase information in image data.

OTHER EMBODIMENTS

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-192223, filed Sep. 29, 2015, and Japanese Patent Application No. 2015-257328, filed Dec. 28, 2015, which are hereby incorporated by reference wherein in their entirety.

What is claimed is:

1. An image processing apparatus comprising:
at least one processor operatively coupled to a memory, serving as:
(a) an obtaining unit configured to obtain a contrast material-enhanced image of an object;
(b) a first region extraction unit configured to extract a first region representing a first anatomical portion of the object from the image;
(c) an estimation unit configured to estimate a state of the image concerning a temporal change in gray level from the first region; and
(d) a second region extraction unit configured to extract a second region representing a second anatomical portion of the object from the image based on an estimation result obtained by the estimation unit.

2. The apparatus according to claim 1, further comprising a calculation unit configured to calculate a feature amount concerning gray levels from the first region,
wherein the estimation unit estimates the state based on a comparison between the feature amount and statistical data concerning gray levels.

3. The apparatus according to claim 1, wherein the first anatomical portion comprises a portion exhibiting a small positional variation among patients.

4. The apparatus according to claim 1, wherein the first anatomical portion comprises a plurality of portions exhibiting different temporal enhancement patterns.

5. The apparatus according to claim 4, wherein the first anatomical portion comprises the liver and the heart.

6. The apparatus according to claim 1, wherein the second region extraction unit extracts the second region based on statistical data concerning gray levels, which is selected based on the estimation result.

7. The apparatus according to claim 1, wherein the second region extraction unit extracts, as the second region, each of regions of all portions included in the contrast material-enhanced image, including the same portions as the first region.

8. The apparatus according to claim 1, wherein the state concerning the temporal change in gray level comprises a phase at the time of contrast material-enhancement.

9. The apparatus according to claim 8, wherein the second region extraction unit extracts the second region based on statistical data associated with the estimated phase.

10. The apparatus according to claim 1, wherein the second anatomical portion includes a portion identical to the first anatomical portion, and
the second region extraction unit comprises processing of extracting, with higher accuracy, a region of the first anatomical portion.

11. An image processing apparatus comprising:
at least one processor operatively coupled to a memory, serving as:
(a) an obtaining unit configured to obtain a contrast material-enhanced image of an object;
(b) a first region extraction unit configured to extract a first region representing a first anatomical portion of the object from the image;
(c) an estimation unit configured to estimate a prior distribution of gray levels in a second region representing a second anatomical portion of the object based on a feature amount concerning gray levels in the first region; and
(d) a second region extraction unit configured to extract the second region from the image by using the prior distribution.

12. An image processing apparatus comprising:
at least one processor operatively coupled to a memory, serving as:
(a) an image obtaining unit configured to obtain a contrast material-enhanced image of an object;
(b) a feature obtaining unit configured to obtain a feature representing a temporal change in gray level of the image from the image;
(c) a calculation unit configured to calculate, for each pixel in the image, a belongingness degree with respect to an anatomical portion as an extraction target from the image by using the feature; and
(d) an extraction unit configured to extract the anatomical portion existing in the image by using the belongingness degree.

13. The apparatus according to claim 12, wherein the feature comprises a phase.

14. The apparatus according to claim 12, further comprising a generation unit configured to generate a graph in a graph cut method,
wherein the generation unit assigns energies to links between image nodes and terminal nodes in the graph based on the belongingness degree of the pixel in the image corresponding to each of the image nodes, and
the extraction unit extracts the anatomical portion based on the graph.

15. The apparatus according to claim 12, wherein the calculation unit calculates the belongingness degree based on an image gray level of the image.

16. The apparatus according to claim 12, wherein the calculation unit calculates the belongingness degree based on a probability that the anatomical portion exists at a particular position in the image.

17. A method of controlling an image processing apparatus, the method comprising:
obtaining a contrast material-enhanced image of an object;
extracting a first region representing a first anatomical portion of the object from the image;
estimating a state of the image concerning a temporal change in gray level from the first region; and
extracting a second region representing a second anatomical portion of the object from the image based on an estimation result obtained in the estimating.

18. A method of controlling an image processing apparatus, the method comprising:
obtaining a contrast material-enhanced image of an object;
extracting a first region representing a first anatomical portion of the object from the image;
estimating a prior distribution of gray levels in a second region representing a second anatomical portion of the object based on a feature amount concerning gray levels in the first region; and
extracting the second region from the image by using the prior distribution.

19. A method of controlling an image processing apparatus, the method comprising:
obtaining a contrast material-enhanced image of an object;
obtaining a feature representing a temporal change in gray level of the image from the image;
calculating a belongingness degree with respect to an anatomical portion as an extraction target from the image by using the feature; and
extracting the anatomical portion existing in the image by using the belongingness degree.

20. A non-transitory computer-readable storage medium storing a computer program for causing a computer to execute each step in a method of controlling an image processing apparatus, the method comprising:
obtaining a contrast material-enhanced image of an object;
extracting a first region representing a first anatomical portion of the object from the image;
estimating a state of the image concerning a temporal change in gray level from the first region; and
extracting a second region representing a second anatomical portion of the object from the image based on an estimation result obtained in the estimating.

21. A non-transitory computer-readable storage medium storing a computer program for causing a computer to execute each step in a method of controlling an image processing apparatus, the method comprising:
obtaining a contrast material-enhanced image of an object;
extracting a first region representing a first anatomical portion of the object from the image;
estimating a prior distribution of gray levels in a second region representing a second anatomical portion of the object based on a feature amount concerning gray levels in the first region; and
extracting the second region from the image by using the prior distribution.

22. A non-transitory computer-readable storage medium storing a computer program for causing a computer to execute each step in a method of controlling an image processing apparatus, the method comprising:
obtaining a contrast material-enhanced image of an object;
obtaining a feature representing a temporal change in gray level of the image from the image;
calculating a belongingness degree with respect to an anatomical portion as an extraction target from the image by using the feature; and
extracting the anatomical portion existing in the image by using the belongingness degree.

23. The apparatus according to claim 1, wherein the estimation unit is configured to estimate a continuous state of the image concerning a temporal change in gray level from the first region.

* * * * *